US008358073B2

(12) United States Patent
Hayashi et al.

(10) Patent No.: US 8,358,073 B2
(45) Date of Patent: Jan. 22, 2013

(54) LIGHT SOURCE UNIT FOR A SEMICONDUCTOR-TYPE LIGHT SOURCE OF VEHICLE LIGHTING DEVICE AND A VEHICLE LIGHTING DEVICE

(75) Inventors: Masateru Hayashi, Isehara (JP); Katsuaki Nakano, Isehara (JP); Masaru Kojima, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 190 days.

(21) Appl. No.: 13/008,368

(22) Filed: Jan. 18, 2011

(65) Prior Publication Data

US 2011/0175529 A1 Jul. 21, 2011

(30) Foreign Application Priority Data

Jan. 19, 2010 (JP) ................................ 2010-009423
Oct. 7, 2010 (JP) ................................ 2010-227966

(51) Int. Cl.
*B60Q 1/00* (2006.01)

(52) U.S. Cl. ............................ 315/77; 315/82; 362/240

(58) Field of Classification Search .................... 315/82, 315/76, 77, 56, 57, 59, 58; 362/240, 241, 362/246, 249.01, 249.02, 249.07, 257, 265
See application file for complete search history.

(56) References Cited

U.S. PATENT DOCUMENTS

| | | | | |
|---|---|---|---|---|
| 6,737,811 | B2 * | 5/2004 | Zhang et al. | 315/56 |
| 7,033,043 | B2 * | 4/2006 | Asao et al. | 362/240 |
| 2009/0196063 | A1 | 8/2009 | Kracker et al. | |
| 2009/0322416 | A1 | 12/2009 | Yuasa | |

FOREIGN PATENT DOCUMENTS

| | | | |
|---|---|---|---|
| JP | 2004-031076 | A | 1/2004 |
| JP | 2009-277535 | A | 11/2009 |
| JP | 2010-009423 | A | 1/2010 |
| JP | 2010-227966 | A | 10/2010 |

* cited by examiner

*Primary Examiner* — David H Vu
(74) *Attorney, Agent, or Firm* — Foley & Lardner LLP

(57) ABSTRACT

The present invention includes a light source 10 and a socket 11. The light source 10 includes a base plate 3, light emitting chips 41 to 44 for a semiconductor-type light source, resistors 51, 52, diodes 53, 54 and wiring 6. The socket 11 includes an insulating member 7, a radiating member 8 and feed members 91 to 93. The light source 10 is attached to the socket 11. The base plate 3 is attached to the radiating member 8. Such a structure of the present invention can be implemented in reduced size and with an enhanced heat radiation effect.

16 Claims, 21 Drawing Sheets

LIGHT SOURCE UNIT FOR A SEMICONDUCTOR-TYPE LIGHT SOURCE OF VEHICLE LIGHTING DEVICE AND A VEHICLE LIGHTING DEVICE

CROSS REFERENCE TO RELATED APPLICATIONS

This application claims priority of Japanese Patent Application No. 2010-227966 filed on Oct. 7, 2010 and Japanese Patent Application No. 2010-9423 filed on Jan. 19, 2010. The contents of this application are incorporated herein by reference in their entirety.

BACKGROUND OF THE INVENTION

1. Field of the Invention

The present invention relates to a light source unit for a semiconductor-type light source of a vehicle lighting device. The present invention also relates to a vehicle lighting device which employs the semiconductor-type light source as a light source.

2. Description of the Related Art

Such a light source unit has been known (see, for example, Japanese Patent Application Laid-open No. 2004-31076). Hereinafter, a related art light source unit will be described. In the related art light source unit, an LED, a resistor, a diode and a conductor are mechanically and electrically connected together with upper and lower contact portions and then assembled to a socket casing. The socket casing includes a mounting unit. The related art light source unit is attached to a vehicle lighting device removable by the mounting unit of the socket casing.

The thus-structured related art light source unit tends to be large in size. In addition, the related art light source unit includes no device to cause heat generated in the LED, the resistor, the diode and the conductor to radiate outward. There is therefore a problem regarding heat radiation in the LED, the resistor, the diode and the conductor.

Problems to be solved by the present invention relate to the large size and the heat radiation in the LED, the resistor, the diode and the conductor in the related art light source unit.

SUMMARY OF THE INVENTION

An aspect of the present invention (i.e., an invention recited in claim 1) includes: a light source and a socket to which the light source is attached, wherein: the light source includes a base plate, a light emitting chip for the semiconductor-type light source, a control device which controls light emission of the light emitting chip and a wiring device which supplies electric power to the light emitting chip via the control device, the light emitting chip, the control device, and the wiring device being attached to the base plate; the socket includes an insulating member, a radiating member which makes heat generated in the light source radiate outward and a feed member which supplies electric power to the light source, the radiating member and the feed member being assembled to the insulating member in a mutually insulated manner; the base plate and the radiating member are in abutment with each other; and the insulating member includes a mounting unit for an attachment to the vehicle lighting device in a removable manner.

In an aspect of the present invention (i.e., an invention recited in claim 2), the socket includes a connector unit to which a power supply side connector is attached to be mechanically removable and electrically connected and disconnected; and the connector unit is constituted by a part of the insulating member and a part of the feed member.

In an aspect of the present invention (i.e., an invention recited in claim 3), the light source includes a cover which covers the socket; and the cover includes an optical control unit which optically controls light emitted from the light emitting chip.

In an aspect of the present invention (i.e., an invention recited in claim 4), a highly reflective surface is provided on a surface of the base plate on which the light emitting chip is provided.

In an aspect of the present invention (i.e., an invention recited in claim 5), the base plate and the radiating member are made to adhere to each other by a thermally conductive adhesive and therefore the radiating member and the insulating member are in close contact with each other.

In an aspect of the present invention (i.e., an invention recited in claim 6), the base plate includes a notch at a position at which the feed member is disposed; the insulating member includes a projection at a position corresponding to the notch to be disposed in the notch; and the feed member protrudes from the projection and is bent to be electrically connected to the wiring device of the base plate.

In an aspect of the present invention (i.e., an invention recited in claim 7), the radiating member is partially exposed from the insulating member.

In an aspect of the present invention (i.e., an invention recited in claim 8), the base plate is in contact with the radiating member and not in contact with the insulating member.

In an aspect of the present invention (i.e., an invention recited in claim 9), a part of the radiating member is covered with the insulating member.

In an aspect of the present invention (i.e., an invention recited in claim 10), a cleated portion is provided at least partially on a surface of the radiating member which is in contact with the insulating member.

In an aspect of the present invention (i.e., an invention recited in claim 11), the base plate is mechanically attached to the radiating member with a fixing portion which is a portion of the feed member.

An aspect of the present invention (i.e., an invention recited in claim 12) includes: a lamp housing and a lamp lens which altogether define a lamp compartment; and the light source unit for the semiconductor-type light source of the vehicle lighting device according to claim 1 disposed in the lamp compartment.

In an aspect of the present invention (i.e., an invention recited in claim 13), the socket is attached to the lamp housing; the light source is disposed in the lamp compartment; and a portion of the socket protruding outward from the lamp housing is larger in diameter than a portion of the socket housed in the lamp compartment.

In an aspect of the present invention (i.e., an invention recited in claim 14), a waterproof packing is provided between the lamp housing, at a portion outside the lamp compartment, and the insulating member of the socket.

In an aspect of the present invention (i.e., an invention recited in claim 15), the socket is removably attached to the lamp housing with the mounting unit rotated about a central axis of the socket; and the light emitting chip is disposed near the central axis of the socket.

In an aspect of the present invention (i.e., an invention recited in claim 16), a part of the radiating member is formed as a fin-shaped portion; and the lamp housing and the insulating member each include a stopper which causes the socket to be stopped at a predetermined position such that the fin-shaped portion of the radiating member is oriented along an air flow direction when the socket is attached to the lamp housing by the mounting unit.

In the light source unit for the semiconductor-type light source of the vehicle lighting device according to the present invention (i.e., an invention recited in claim 1), the light source is constituted by the light emitting chip, the control device and the wiring device which are attached to the base plate, while the socket is constituted by the radiating member and the feed member integrally assembled to the insulating member in a mutually insulated manner. The light source is attached to the socket with the base plate and the radiating member in abutment with each other. In the light source unit for the semiconductor-type light source of the vehicle lighting device according to the present invention (i.e., an invention recited in claim 1), the light source constituted by the light emitting chip, the control device, the wiring device and the base plate and the socket constituted by the radiating member, the feed member and the insulating member are integrally assembled together. Thus, the light source unit for the semiconductor-type light source of the vehicle lighting device according to the present invention (i.e., an invention recited in claim 1), can be reduced in size as compared with a related art light source unit in which an LED, a resistor, a diode and a conductor are mechanically and electrically connected together with upper and lower contact portions and then assembled to a socket casing.

In the light source unit for the semiconductor-type light source of the vehicle lighting device according to the present invention (i.e., an invention recited in claim 1), heat generated in the light emitting chip, the control device and the wiring device is transferred to the radiating member via the base plate by the means for solving the problem and is made to radiate outward (by emission, diffusion, heat radiation, heat divergence and heat diffusion) from the radiating member. Accordingly, the light source unit for the semiconductor-type light source of the vehicle lighting device according to the present invention (i.e., an invention recited in claim 1) can solve the problem regarding heat radiation in the light emitting chip, the control device and the wiring device.

The light source unit for the semiconductor-type light source of the vehicle lighting device according to the present invention (i.e., an invention recited in claim 1) can be removably attached to the vehicle lighting device with the mounting unit of the insulating member of the socket. Thus, the light source unit can be removed from the vehicle lighting device and replaced.

In the light source unit for the semiconductor-type light source of the vehicle lighting device according to the present invention (i.e., an invention recited in claim 2), the connector unit is constituted by a part of the insulating member and a part of the feed member. Thus, the effect of reduction in size and the heat radiation effect are not impaired even if the connector unit is provided in the socket.

In the light source unit for the semiconductor-type light source of the vehicle lighting device according to the present invention (i.e., an invention recited in claim 3), the light source is covered with the cover. Thus, the light emitting chip, the control device, the wiring device and the base plate of the light source can be protected by the cover. In the light source unit for the semiconductor-type light source of the vehicle lighting device according to the present invention (i.e., an invention recited in claim 3), since the light emitted from the light emitting chip can be controlled optically by the optical control unit of the cover, the optical control design of the vehicle lighting device is simplified.

In the light source unit for the semiconductor-type light source of the vehicle lighting device according to the present invention (i.e., an invention recited in claim 4), the light emitted from the light emitting chip can be reflected with high reflectivity on the highly reflective surface of the base plate. The light emitted from the light emitting chip can be used effectively.

In the light source unit for the semiconductor-type light source of the vehicle lighting device according to the present invention (i.e., an invention recited in claim 5), heat generated in the light emitting chip, the control device and the wiring device of the light source is transferred from the base plate to the radiating member via the thermally conductive adhesive by the means for solving the problem and is then made to radiate outward. The heat is then transferred from the radiating member to the insulating member where the heat is made to radiate outward. Thus, the heat radiation effect is enhanced.

In the light source unit for the semiconductor-type light source of the vehicle lighting device according to the present invention (i.e., an invention recited in claim 6), the feed member is made to protrude from the projection of the insulating member and is bent to be electrically connected to the wiring device of the base plate. Thus, the effect of reduction in size and the heat radiation effect are not impaired. In the light source unit for the semiconductor-type light source of the vehicle lighting device according to the present invention (i.e., an invention recited in claim 6), the feed member protrudes from the projection of the insulating member and is not in contact with the base plate. Thus, no bending stress is applied from the feed member to the base plate. Thus, no damage, such as cracks, occurs in the base plate.

In the light source unit for the semiconductor-type light source of the vehicle lighting device according to the present invention (i.e., an invention recited in claim 7), a part of the radiating member is exposed directly outside from the insulating member. Thus, heat transferred from the light emitting unit to the radiating member can be efficiently emitted outward and the heat radiation effect can be further enhanced.

In the light source unit for the semiconductor-type light source of the vehicle lighting device according to the present invention (i.e., an invention recited in claim 8), the base plate is in contact with the radiating member and not in contact with the insulating member. Thus, heat generated in the light emitting chip, the control device and the wiring device is efficiently transferred to the radiating member via the base plate and is made to efficiently radiate outward from the radiating member. Thus, the heat radiation effect is enhanced.

In the light source unit for the semiconductor-type light source of the vehicle lighting device according to the present invention (i.e., an invention recited in claim 9), the radiating member is partially covered with the insulating member. Thus, adhesiveness between the part of the radiating member and the insulating member is increased, waterproofness and reliability between the radiating member and the insulating member are enhanced, whereby the radiating member is less easily separated from the insulating member.

In the light source unit for the semiconductor-type light source of the vehicle lighting device according to the present invention (i.e., an invention recited in claim 10), a cleated portion is provided at least partially on a surface of the radiating member which is in contact with the insulating member. Thus, adhesiveness between the part of the radiating member and the insulating member is increased, waterproofness and reliability between the radiating member and the insulating member are enhanced, whereby the radiating member is less easily separated from the insulating member.

In the light source unit for the semiconductor-type light source of the vehicle lighting device according to the present invention (i.e., an invention recited in claim 11), the base plate is mechanically attached to the radiating member with a fixing portion which is a part of the feed member. Thus, the base plate can be securely fixed to the radiating member, and can be attached, thereby providing sufficient resistance to vehicle vibration.

The vehicle lighting device according to the present invention (i.e., an invention recited in claim 12) achieves effects similar to those of the light source unit for the semiconductor-type light source of the vehicle lighting device recited in claim 1 with the means for solving the problems.

In the vehicle lighting device according to the present invention (i.e., an invention recited in claim 13), a portion of the socket protruding from the lamp housing is larger in diameter than a portion of the socket housed in the lamp compartment. Thus, heat generated in the light source is emitted outward via the socket which protrudes in the most part thereof. Thus, the heat radiation effect is further enhanced.

In the vehicle lighting device according to the present invention (i.e., an invention recited in claim 14), The waterproof packing provided between the lamp housing, at a portion outside the lamp compartment, and the insulating member of the socket enhances waterproofness. The most of the heat generated in the light source is emitted outward from the radiating member of the socket and thus the amount of heat transferred to the insulating member of the socket is small. Thus, the waterproof packing disposed between the lamp housing, at a portion outside the lamp compartment, and the insulating member of the socket can be protected from the heat of the light source.

In the vehicle lighting device according to the present invention (i.e., an invention recited in claim 15), when the socket is rotated about the center of the socket to be attached to the lamp housing by the mounting unit and thereby the light source is disposed inside the lamp compartment with the means for solving the problems, the light emitting chip is located near the center of the socket via the base plate and the radiating member. Thus, positional variation of the lamp compartment of the light emitting chip can be reduced as much as possible. Thus, in the vehicle lighting device according to the present invention (i.e., an invention recited in claim 15), variation in light distribution can be reduced as much as possible. With this, light distribution control becomes easy and the light distribution design is simplified, whereby eventually contributing to traffic safety.

In the vehicle lighting device according to the present invention (i.e., an invention recited in claim 16), the fin-shaped portion of the radiating member is oriented along the air flow direction by the means for solving the problem when socket is attached to the lamp housing by the mounting unit. With this, heat is made to radiate in the air flow direction along the fin-shaped portion of the radiating member. Thus, the heat radiation effect is further enhanced. Note that the vehicle lighting device usually includes a rib and a clearance at least one of the lamp housing or the vehicle body for the mounting of the lamp housing on the vehicle body. In that case, air is caused to flow along the rib or the clearance. Thus, the vehicle lighting device according to the present invention (i.e., an invention recited in claim 16) is suited to enhance the heat radiation effect in the case described above.

DESCRIPTION OF THE PREFERRED EMBODIMENTS

Hereinafter, light source units for a semiconductor-type light source of a vehicle lighting device according to first to sixth embodiments of the present invention and a vehicle lighting device according to the first to sixth embodiments of the present invention will be described in detail with reference to the drawings. The embodiments are illustrative and not restrictive.

First Embodiment

FIGS. 1 to 21 illustrate a light source unit for a semiconductor-type light source of a vehicle lighting device and a vehicle lighting device according to the first embodiment of the present invention.

Figure 18:
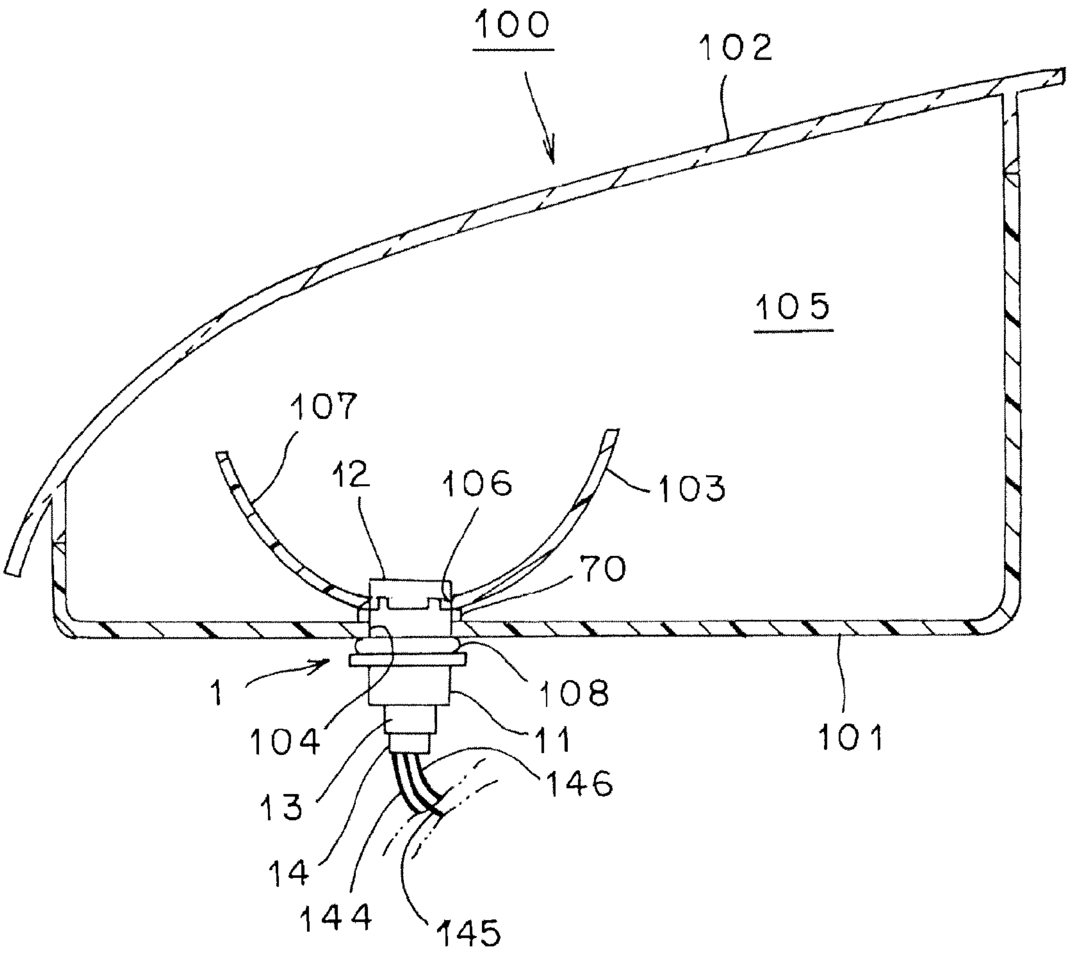
FIG. 18 is a longitudinal sectional view (i.e., a vertical sectional view) of the vehicle lighting device according to the first embodiment of the present invention.
Figure 19:
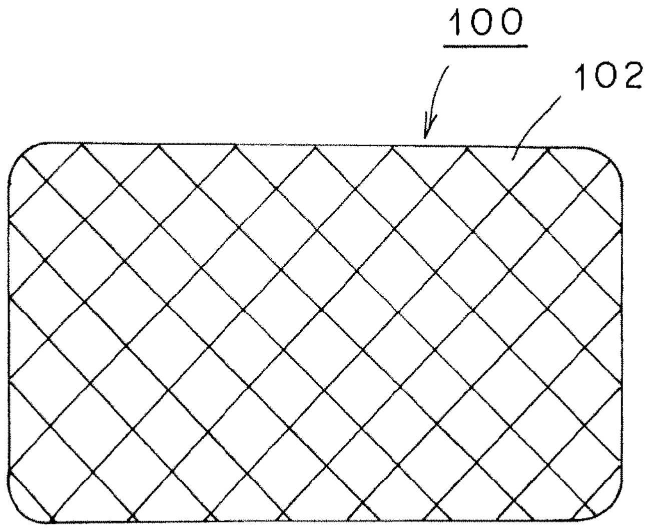
FIG. 19 illustrates a lighted state of a tail lamp function.
Figure 20:
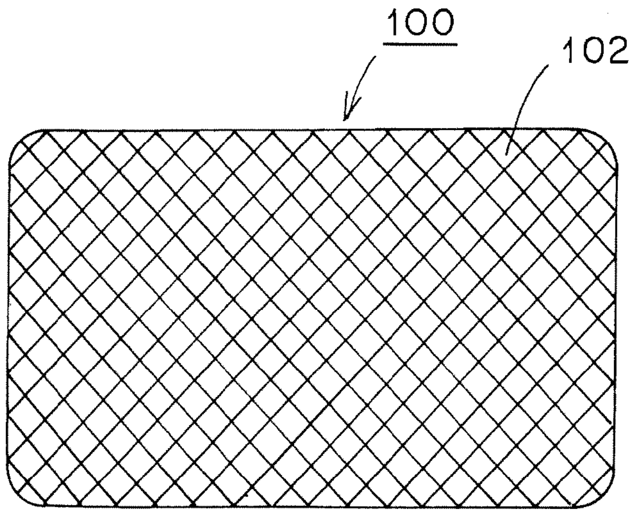
FIG. 20 illustrates a lighted state of a stop lamp function.

Hereinafter, configurations of the light source unit for the semiconductor-type light source of the vehicle lighting device according to the first embodiment 1 and the vehicle lighting device according to the first embodiment will be described. In FIG. 18, reference numeral 100 denotes a vehicle lighting device according to the first embodiment.

[Vehicle Lighting Device 100]

The vehicle lighting device 100 is a tail stop lamp with a single lighting system in the first embodiment. The single lighting system (with a single lamp and a single lighting device) of the vehicle lighting device 100 constitutes both a tail lamp function (see FIG. 19) and a stop lamp function (see FIG. 20). The vehicle lighting device 100 is provided at left and right sides of a rear section of a vehicle (not illustrated). The vehicle lighting device 100 may be combined with other unillustrated lamp functions (e.g., a reversing lamp function) to constitute a rear combination lamp.

As illustrated in FIG. 18, the vehicle lighting device 100 includes a lamp housing 101, a lamp lens 102, a reflector 103, a light source unit which includes the semiconductor-type light source as a light source and a drive circuit 2 (see FIG. 21) for the semiconductor-type light source of the light source unit 1. The light source unit is a light source unit 1 for a semiconductor-type light source of a vehicle lighting device according to the first embodiment.

The lamp housing 101 is made of, for example, a material which is not light transmissive (e.g., a resin material). The lamp housing 101 has a hollow structure with one end open and the other end closed. The lamp housing 101 is provided with a through hole 104 at the closed end thereof.

The lamp lens 102 is made of, for example, a material which is light transmissive (e.g., a transparent resin material and a glass material). The lamp lens 102 has a hollow structure with one end open and the other end closed. A peripheral edge of the opening of the lamp lens 102 and a peripheral edge of the opening of the lamp housing 101 are fixed together in a watertight manner. The lamp housing 101 and the lamp lens 102 altogether defines a lamp compartment 105.

The reflector 103 is a light distribution control unit which performs light distribution control of light emitted from the light source unit 1 and includes a focus F. The reflector 103 is disposed in the lamp compartment 105 and is fixed to, for example, the lamp housing 101. The reflector 103 is made of, for example, a material which is not light transmissive (e.g., a resin material and a metallic material). The reflector 103 has a hollow structure with one end open and the other end closed. The reflector 103 is provided with a through hole 106 at the closed end thereof such that the through hole 106 communicates with the through hole 104 of the lamp housing 101. An inner surface of the reflector 103 is formed as a reflective surface 107. Although the reflector 103 is provided separately from the lamp housing 101, the reflector 103 may be integrated with the lamp housing 101. In that case, the lamp housing 101 includes a reflective surface which provides a reflecting function.

As illustrated in FIGS. 13 to 17, the through hole 104 of the lamp housing 101 is a circular hole. The through hole 104 includes a plurality of (four in the first embodiment) recesses 109 and a plurality of (two in the first embodiment) stoppers 110 both arranged at substantially regular intervals along a peripheral edge of the through hole 104.

[Light Source Unit 1]

As illustrated in FIGS. 1 to 17, the light source unit 1 includes a light source 10, a socket 11 and a cover 12. The light source 10 and the cover 12 are attached to one end (i.e., an upper end) of the socket 11. The light source 10 is covered with the cover 12.

As illustrated in FIG. 18, the light source unit 1 is mounted on the vehicle lighting device 100. The socket 11 is attached to the lamp housing 101 in a watertight and removable manner via a waterproof packing (i.e., an O ring) 108. The light source 10 and the cover 12 are disposed inside the lamp compartment 105 on the reflector 103 at the side of the reflective surface 107 through the through hole 104 of the lamp housing 101 and the through hole 106 of the reflector 103.

[Light Source 10]

As illustrated in FIGS. 1 to 5, 7 to 9, 12 and 21, the light source 10 includes a base plate 3, a plurality of (four in the first embodiment) light emitting chips 41, 42, 43 and 44 of the semiconductor-type light source, two resistors 51 and 52 and two diodes 53 and 54 as control devices and wiring 6 as a wiring device.

The base plate 3 is made of a ceramic material in the first embodiment. As illustrated in FIGS. 1 to 5, 7 to 9 and 12, the base plate 3 is formed as a substantially octagonal plate when seen from above. The base plate 3 includes notches 31, 32 and 33 each of which is positioned at a substantial center of three sides (i.e., a right side, a left side and a lower side) of the base plate 3. The base plate 3 includes a flat mounting surface 34 in one surface (i.e., an upper surface) thereof. The base plate 3 includes a flat contact surface 35 in another surface (i.e., a lower surface) thereof. The mounting surface 34 of the base plate 3 is provided with a highly reflective surface 30 made of, for example, a highly reflective coat and a highly reflective vapor deposit.

The four light emitting chips 41 to 44, the two resistors 51, 52, the two diodes 53, 54, and the wiring 6 are attached to the mounting surface 34 of the base plate 3 (that is, provided by mounting, printing, vapor deposition, etc.). For ease of illustration, the two resistors 51, 52, the two diodes 53, 54 and the wiring 6 are not sometimes illustrated in FIGS. 1 to 4.

The semiconductor-type light source constituted by the four light emitting chips 41 to 44 employs a light emitting semiconductor-type light source, such as an LED and an organic electroluminescence (EL). In the present embodiment, the light source is an LED. As illustrated in FIGS. 1 to 4, 7 and 12, each the light emitting chips 41 to 44 is a semiconductor chip (light source chip) which is formed as a small rectangular (square or rectangular) when seen from above. In the first embodiment, the light emitting chips 41 to 44 are bare chips. As illustrated in FIG. 4, the four light emitting chips 41 to 44 are arranged in line near the focus F of the reflector 103 of an optical system and near a center O (i.e., a center of rotation for mounting) of the socket 11 of the light source unit 1 so as to emit light close to that of a filament of a light source bulb (i.e., an electric bulb) or arc discharge of a discharge lamp bulb (i.e., a HID lamp). The four light emitting chips 41 to 44 are connected in series along a forward direction.

The four light emitting chips 41 to 44 are grouped into some (two in the first embodiment) light emitting chips 43, 44 constituting the tail lamp function and into the whole (four in the first embodiment) light emitting chips 41 to 44 constituting the stop lamp function. The two light emitting chips 43, 44 among the linearly arranged four light emitting chips 41 to 44 constitute both the tail lamp function and the stop lamp function. The two light emitting chips 41 and 42 disposed at both (outermost) ends of the linearly arranged four light emitting chips 41 to 44 constitute only the stop lamp function. The two light emitting chips 43, 44 constituting the tail lamp function which doubles the stop lamp function (hereinafter, simply referred to as a "tail lamp function") are disposed between the two light emitting chips 41 and 42 constitute only the stop lamp function. The four light emitting chips 41 to 44 employ bare chips, such as flip chips, wire bonding chips or reflective chips.

The resistors 51 and 52 are made of, for example, thin film resistors or thick film resistors. The resistors 51 and 52 are provided for the adjustment to obtain a predetermined driving current value. Variation in forward voltage characteristics (Vf) of the light emitting chips 41 to 44 causes variation in the driving current value supplied to the light emitting chips 41 to 44 thereby causing variation in luminosity (i.e., luminous flux, luminous intensity, illuminance) of the light emitting chips 41 to 44. For this reason, variation in luminosity (i.e., luminous flux, luminous intensity, illuminance) of the light emitting chips 41 to 44 can be controlled (i.e., absorbed) by controlling (i.e., trimming) values of the resistors 51, 52 to set the driving current value supplied to the light emitting chips 41 to 44 to substantially uniform. In the trimming, the resistors 51, 52 are, for example, partially trimmed by laser to control the resistance value. The resistance value is increased by the trimming.

Figure 21:
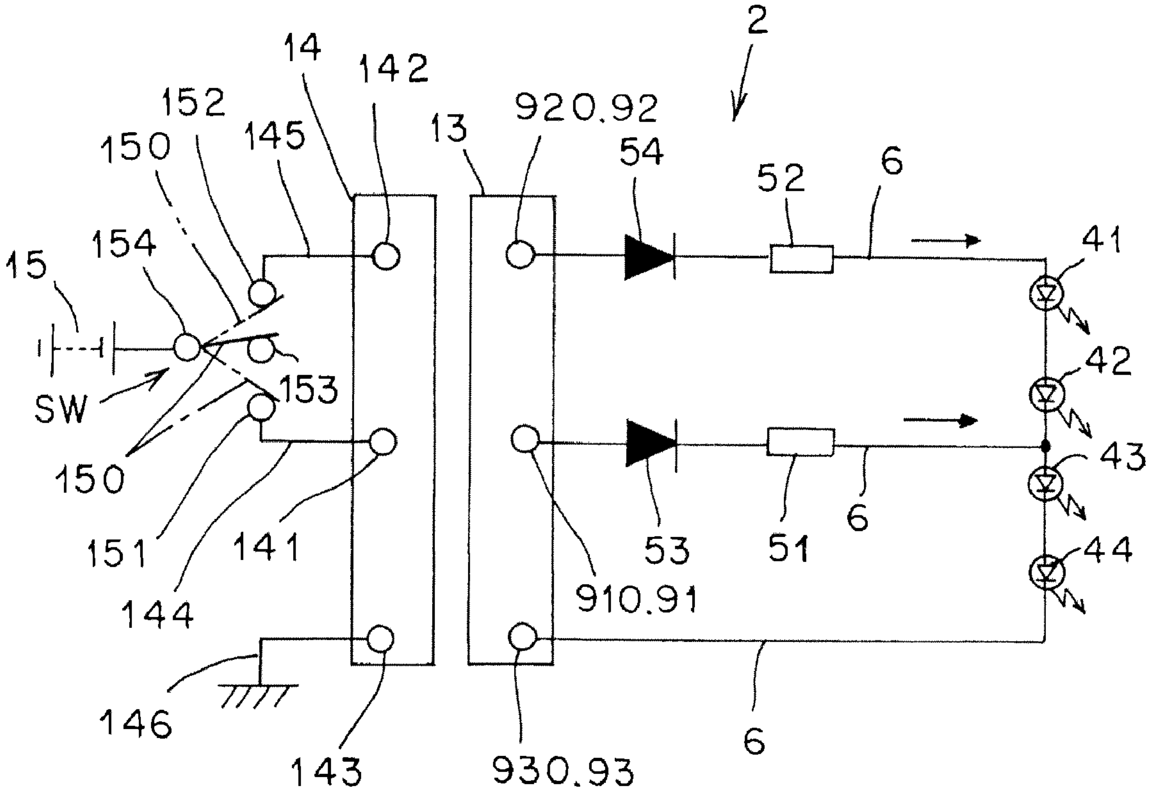
FIG. 21 is an electric diagram of a drive circuit for the semiconductor-type light source of the light source unit.

Although a single resistor 51 connected in series to the two light emitting chips 43, 44 constituting the tail lamp function and a single resistor 52 connected in series to the four light emitting chips 41 to 44 constituting the stop lamp function are illustrated in FIG. 21, two or more resistors 51 and resistors 52 may be provided depending on capacity of the resistors and a variable width of the resistors to be controlled. For example, two resistors 51 and two resistors 52 may be provided. Alternatively, three resistors 51 constituting the tail lamp function and four resistors 52 constituting the stop lamp function may be disposed.

The diodes 53, 54 are made of, for example, bare chip diodes or SMD diodes. The diode 53 is connected in series to the two light emitting chips 43, 44 constituting the tail lamp function and the resistor 51. The diode 54 is connected in series to the four light emitting chips 41 to 44 constituting the stop lamp function and the resistor 52. The diodes 53, 54 are provided for protection against reverse connection and protection against pulse noise from a reverse direction.

The wiring 6 is made of, for example, thin film wiring or thick film wiring of a conductive material, or a wire. The wiring 6 supplies electric power to the light emitting chips 41 to 44 via the resistors 51, 52 and the diodes 53, 54.

[Socket 11]

As illustrated in FIGS. 1 to 12 and 14 to 18, the socket 11 includes an insulating member 7, a radiating member 8 such as a heatsink and three feed members 91, 92 and 93. The radiating member 8 which are thermally and electrically conductive and the feed members 91 to 93 which are electrically conductive are integrally assembled in the insulating member 7 in an insulated manner.

[Insulating Member 7]

The insulating member 7 is made of, for example, an insulating resin material. The insulating member 7 is formed as a substantial cylinder having an outer diameter which is slightly smaller than an inner diameter of the through hole 104 of the lamp housing 101. A flange 71 is provided integrally with one end (i.e., an upper end) of the insulating member 7. A plurality of (four in the first embodiment) mounting units 70 are provided integrally with one end (i.e., the upper end) of the insulating member 7 so as to correspond to the recesses 109 of the lamp housing 101.

The light source unit 1 is mounted on the vehicle lighting device 100 with the mounting units 70. In particular, portions of the socket 11 at the side of the cover 12 and the mounting units 70 are inserted in the through hole 104 of the lamp housing 101 and the recesses 109 (see FIGS. 14 and 16) in a direction of the upward-pointing arrow in FIG. 16. From this state, the socket 11 is rotated about the center O in a direction of the arrow in FIGS. 14 and 16 until the mounting units 70 abut the stoppers 110 of the lamp housing 101. In this state, an edge of the through hole 104 of the lamp housing 101 is sandwiched vertically by the mounting units 70 and the flange 71 via the waterproof packing 108 (see FIGS. 14 and 16).

Figure 11:
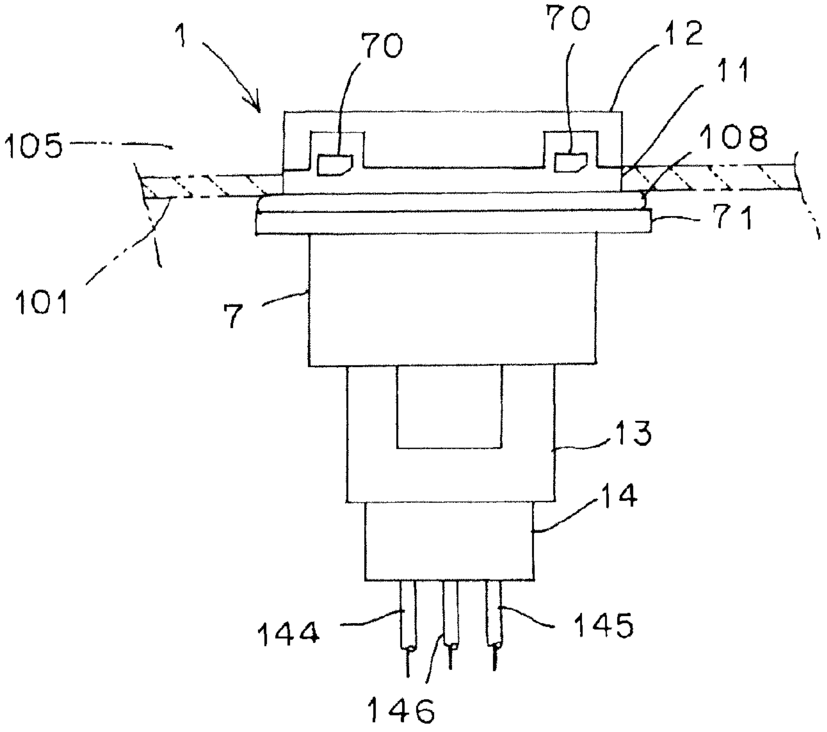
FIG. 11 is a front view of the waterproof packing, the cover, the light source, the socket and the connector which are assembled together.

Thus, as illustrated in FIG. 18, the socket 11 of the light source unit 1 is attached to the lamp housing 101 of the vehicle lighting device 100 in an watertight and removable manner via the waterproof packing 108. In this state, as illustrated in FIG. 11, a portion of the socket 11 protruding from the lamp housing 101 (i.e., a portion below the lamp housing 101 illustrated by a two-dot chain line in FIG. 11) is larger in diameter than a portion of the socket 11 housed in the lamp compartment 105 (i.e., a portion above the lamp housing 101 illustrated by the two-dot chain line in FIG. 11).

A connector unit 13 at the side of the light source is provided integrally with the other end (i.e., a lower end) of the insulating member 7. A connector 14 at the side of a power supply is attached to the connector unit 13 to be mechanically removable and electrically connected and disconnected.

[Radiating Member 8]

The radiating member 8 is made of, for example, a thermally conductive aluminum die-cast material or resin material. One end (i.e., an upper end) of the radiating member 8 is formed as a flat plate while the other end (i.e., a lower end) is formed as a fin-shaped portion extending from a central portion. The radiating member 8 includes a contact surface 80 in an upper surface at the one end. The contact surface 35 of the base plate 3 is made, in abutment with each other, to adhere to the contact surface 80 of the radiating member 8 with a thermally conductive adhesive 36. Thus, the light emitting chips 41 to 44 are located to correspond to a position at which a portion near the center O (i.e., the center O of the socket 11) of the radiating member 8 is located via the base plate 3.

The thermally conductive adhesive 36 is made of, for example, an epoxy resin adhesive, a silicon resin adhesive and an acrylic-based resin adhesive. The thermally conductive adhesive 36 is, for example, a liquid adhesive, a fluid adhesive or a tape adhesive.

The radiating member 8 includes notches 81, 82 and 83 each of which is positioned at a substantial center of three sides (i.e., a right side, a left side and a lower side) of the radiating member 8 so as to correspond to the notches 31 to 33 of the base plate 3. The three feed members 91 to 93 are disposed in the notches 81 to 83 of the radiating member 8 and the notches 31 to 33 of the base plate 3. The insulating member 7 is disposed between the radiating member 8 and the feed members 91 to 93. The radiating member 8 is in tight contact with the insulating member 7. The feed members 91 to 93 are in tight contact with the insulating member 7.

[Feed Members 91 to 93]

The feed members 91 to 93 are, for example, made of a conductive metallic material. One ends (i.e., upper ends) of the feed members 91 to 93 are divergent to be disposed in the notches 81 to 83 of the radiating member 8 and the notches 31 to 33 of the base plate 3. One ends of the feed members 91 to 93 are electrically connected to the wiring 6 of the light source 10.

Figure 5:
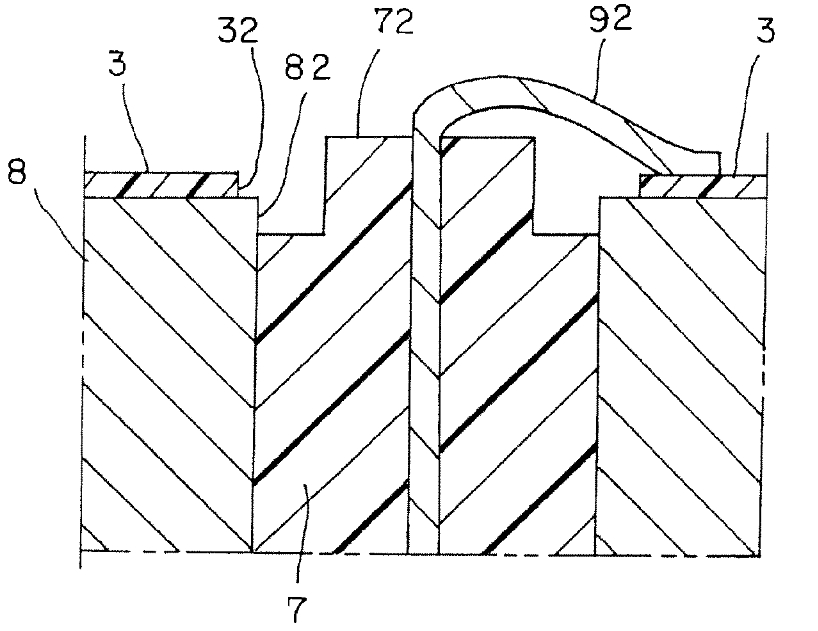
FIG. 5 is a sectional view through section V-V of FIG. 4.
Figure 6:
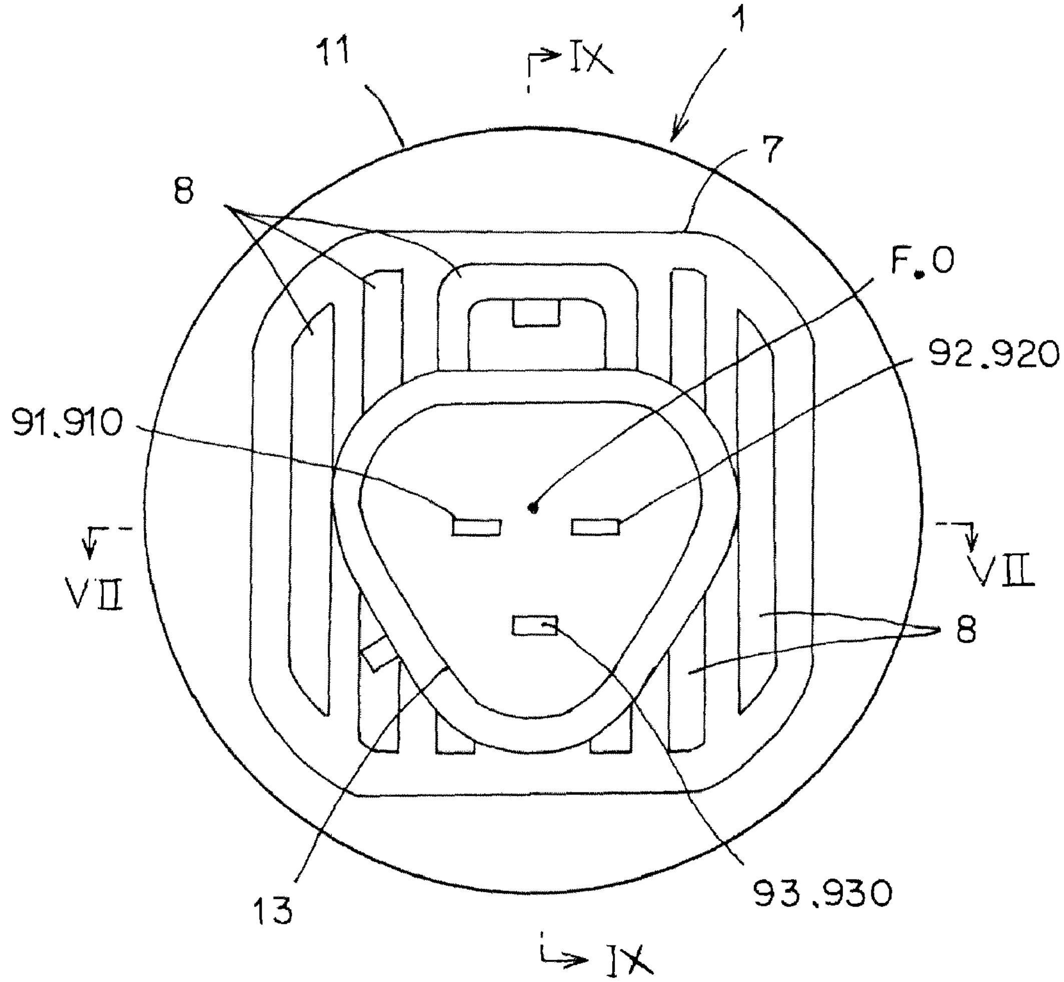
FIG. 6 is a bottom view (i.e., a view seen from below) illustrating the light source and the socket which are assembled together.

In particular, as illustrated in FIG. 5, a projection 72 projected into the notches 31 to 33 and 81 to 83 is integrally formed on one end surface (i.e., an upper end surface) of the insulating member 7 at a position corresponding to the notches 31 to 33 of the base plate 3 and the notches 81 to 83 of the radiating member 8. One ends of the feed members 91 to 93 protrude from the projection 72 and are bent to be electrically connected to the wiring 6 of the base plate 3. One ends of the feed members 91 to 93 and the wiring 6 of the base plate 3 may be electrically connected and fixed together by soldering, laser welding or resistance welding. In this manner, the light source 10 is attached to one end (i.e., an end opening) of the cylindrical-shaped socket 11.

The other ends (i.e., lower ends) of the feed members 91 to 93 are convergent to be disposed in the connector unit 13. The other ends of the feed members 91 to 93 constitute male terminals 910, 920 and 930.

[Connector Unit 13 and Connector 14]

As illustrated in FIG. 21, the connector 14 includes female terminals 141, 142 and 143 which are electrically connected to and disconnected from the male terminals 910 to 930 of the connector unit 13. When the connector 14 is attached to the connector unit 13, the female terminals 141 to 143 are electrically connect to the male terminals 910 to 930. When the connector 14 is removed from the connector unit 13, the female terminals 141 to 143 are electrically disconnected from the male terminals 910 to 930.

As illustrated in FIGS. 18 and 21, the first female terminal 141 and the second female terminal 142 of the connector 14 are connected to a power supply (i.e., a battery of a direct current power supply) 15 via harnesses 144, 145 and a switch SW. The third female terminal 143 of the connector 14 is grounded via a harness 146 (i.e., grounded). The connector unit 13 and the connector 14 are 3-pin (i.e., three feed members 91 to 93, three male terminals 910 to 930 and the three female terminals 141 to 143) connector unit and connector.

[Switch SW]

As illustrated in FIG. 21, the switch SW is a three position switch which includes a movable contact 150, a first fixed contact 151, a second fixed contact 152, a third fixed contact 153 and a common fixed contact 154.

When the movable contact 150 is switched to a position of a first fixed contact 151 (i.e., a position illustrated by a dashed dotted line in FIG. 21), a current (i.e., a driving current) is supplied to the two light emitting chips 43, 44 constituting the tail lamp function via the diode 53 and the resistor 51 constituting the tail lamp function. In particular, the driving current is supplied to the two light emitting chips 43, 44 constituting the tail lamp function via the diode 53 and the resistor 51 constituting the tail lamp function.

When the movable contact 150 is switched to a position of a second fixed contact 152 (i.e., a position illustrated by a two-dot chain line in FIG. 21), the current (i.e., the driving current) is supplied to the four light emitting chips 41 to 44 constituting the stop lamp function via the diode 54 and the resistor 52 constituting the stop lamp function. In particular, the driving current is supplied to the four light emitting chips 41 to 44 constituting the stop lamp function via the diode 54 and the resistor 52 constituting the stop lamp function.

When the movable contact 150 is switched to a position of a third fixed contact 153 (i.e., a position illustrated by a solid line in FIG. 21), a current supply to the four light emitting chips 41 to 44 is suspended.

[Cover 12]

The cover 12 is made of a material which is light transmissive. The cover 12 includes an optical control unit 120, such as a prism, which optically controls and ejects light from the four light emitting chips 41 to 44. One or four optical control units 120 are provided to correspond to the four light emitting chips 41 to 44.

As illustrated in FIGS. 10 to 12 and 18, the cover 12 is attached to one end (i.e., an end opening) of the cylindrical socket 11 to cover the light source 10. The cover 12 prevents the four light emitting chips 41 to 44 from external influences, such as contact with other components and adhesion of dust. That is, the cover 12 protects the four light emitting chips 41 to 44 from disturbance.

Figure 7:
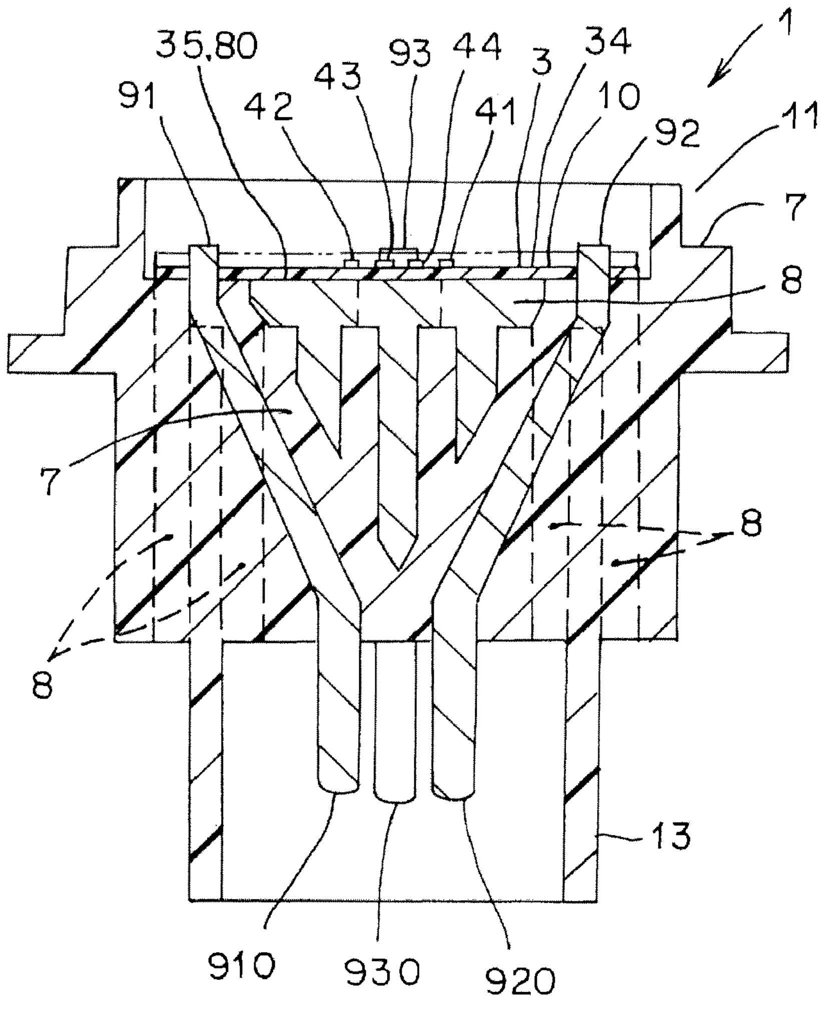
FIG. 7 is a sectional view through section VII-VII of FIG. 6.
Figure 9:
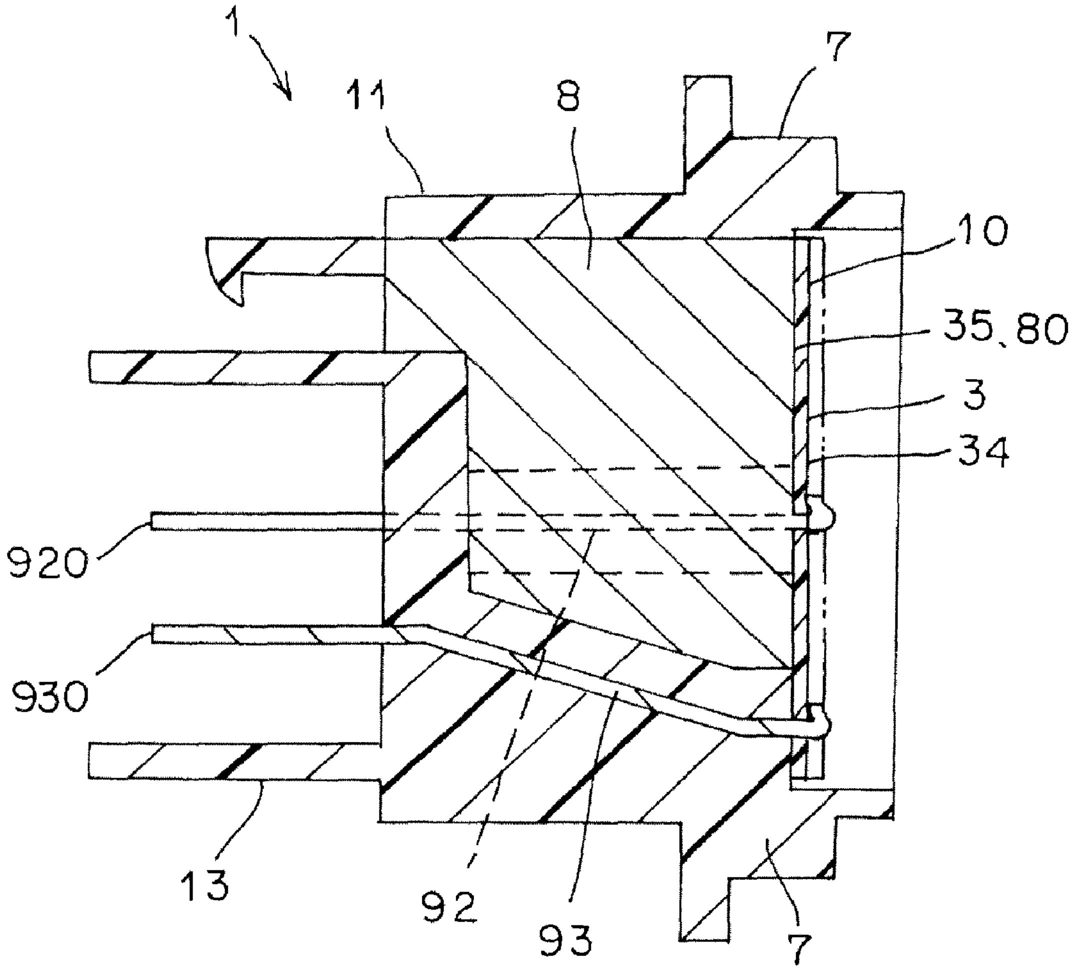
FIG. 9 is a sectional view through section IX-IX of FIG. 6.
Figure 10:
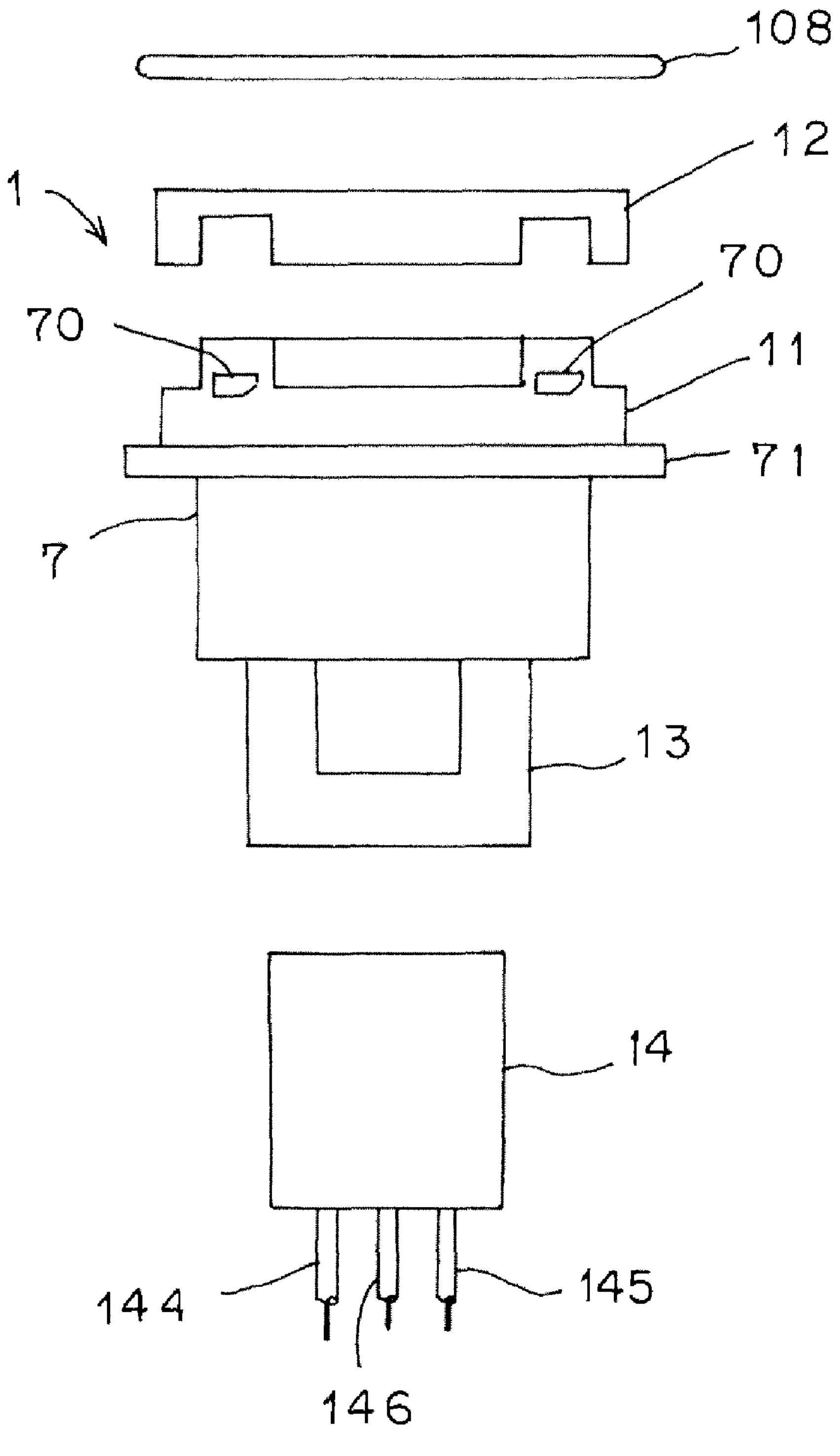
FIG. 10 is an exploded front view of a waterproof packing, a cover, the light source, the socket and a connector.
Figure 12:
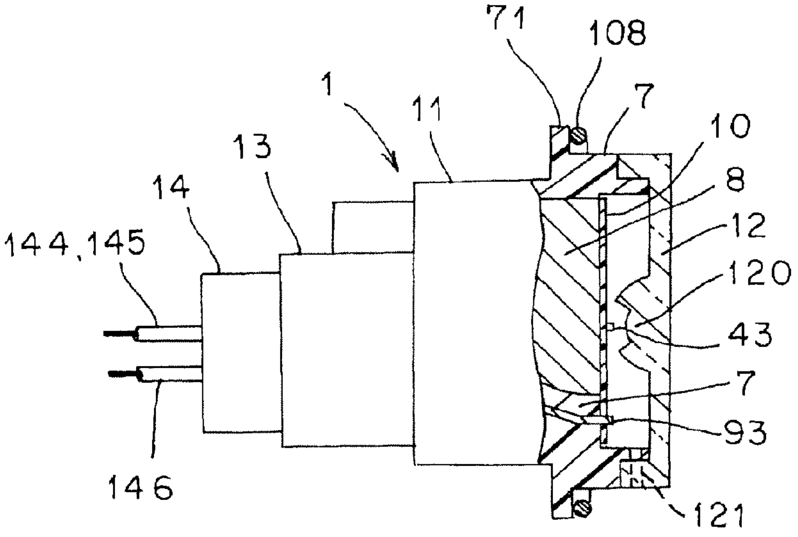
FIG. 12 is a partially exploded front view illustrating the waterproof packing, the cover, the light source, the socket and the connector which are assembled together.
Figure 13:
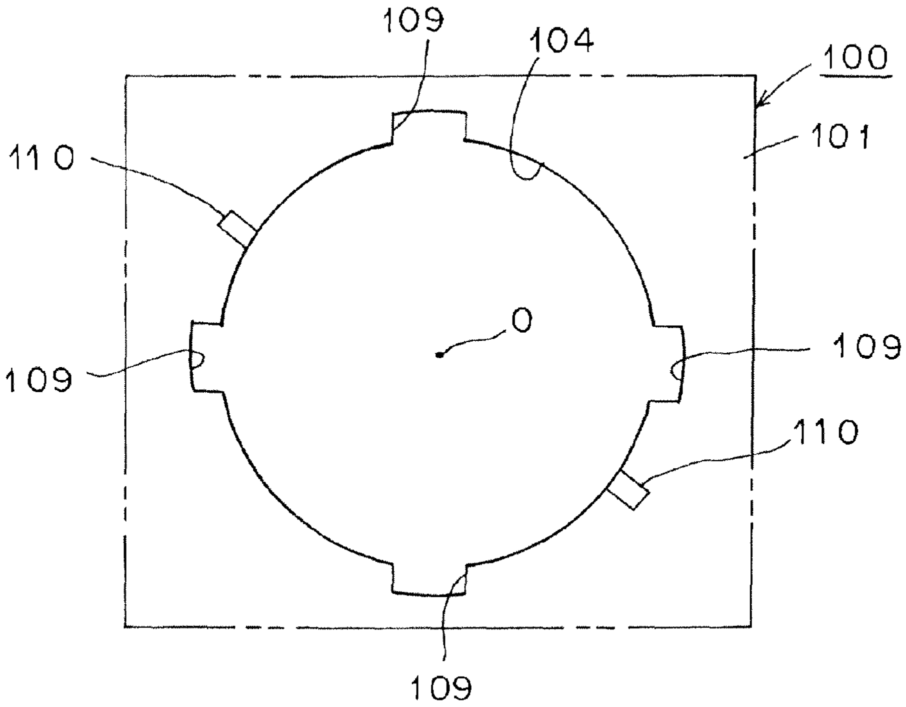
FIG. 13 is a plan view of a mounting hole of a lamp housing.

As illustrated by a dotted line in FIG. 12, an air vent 121 may be provided in the cover 12. In this case, a sealing member illustrated by a two-dot chain line in FIGS. 7 and 9 is provided on the mounting surface 34 of the base plate 3 so as to cover the light emitting chips 41 to 44, the resistors 51, 52, the diodes 53, 54 and the wiring 6.

Hereinafter, operations of the thus-structured light source unit 1 for the semiconductor-type light source of the vehicle lighting device according to the first embodiment and the vehicle lighting device 100 according to the first embodiment (hereinafter, referred to as "the light source unit 1 and the vehicle lighting device 100 according to the first embodiment") will be described.

First, the movable contact 150 of the switch SW is switched to the first fixed contact 151. The current (i.e., the driving current) is then supplied to the two light emitting chips 43, 44 constituting the tail lamp function via the diode 53 and the resistor 51 constituting the tail lamp function. Thus, the two light emitting chips 43, 44 constituting the tail lamp function emit light.

The light emitted from the two light emitting chips 43, 44 constituting the tail lamp function passes through the cover 12 of the light source unit 1 and is subject to light distribution control. The light emitted from the light emitting chips 43, 44 is partially reflected toward the cover 12 by the highly reflective surface of the base plate 3. The light which has been subject to the light distribution control passes through the lamp lens 102 of the vehicle lighting device 100 and is again subject to the light distribution control before being made to radiate outward. In this manner, the vehicle lighting device 100 makes the distributed light constituting the tail lamp function illustrated in FIG. 19 radiate outward.

Next, the movable contact 150 of the switch SW is switched to the second fixed contact 152. The current (i.e., the driving current) is then supplied to the four light emitting chips 41 to 44 constituting the stop lamp function via the diode 54 and the resistor 52 constituting the stop lamp function. Thus, the four light emitting chips 41 to 44 constituting the stop lamp function emit light. In particular, two light emitting chips 41, 42 constituting the stop lamp function which have been turned off start emitting light together with the two light emitting chips 43, 44 constituting the tail lamp function which have been emitted light.

Light emitted from the four light emitting chips 41 to 44 constituting the stop lamp function passes through the cover 12 of the light source unit 1 and is subject to light distribution control. The light emitted from the light emitting chips 41 to 44 is partially reflected toward the cover 12 by the highly reflective surface of the base plate 3. The light having been subject to the light distribution control then passes through the lamp lens 102 of the vehicle lighting device 100 and is again subject to the light distribution control before being made to radiate outward. In this manner, the vehicle lighting device 100 makes the distributed light constituting the stop lamp function illustrated in FIG. 20 radiate outward. Light distribution of the stop lamp function is brighter than that of the tail lamp function (i.e., greater in luminous flux, luminous intensity and illuminance).

The movable contact 150 of the switch SW is then switched to the third fixed contact 153. The current (i.e., the driving current) is then turned off. Thus, the four light emitting chips 41 to 44 or the two light emitting chips 43, 44 are turned off. In this manner, the vehicle lighting device 100 is turned off.

Heat generated in the light emitting chips 41 to 44, the resistors 51, 52, the diodes 53, 54 and the wiring 6 of the light source 10 is transferred to the radiating member 8 via the base plate 3 and is made to radiate outward from the radiating member 8.

Hereinafter, operations of the thus-structured light source unit 1 and vehicle lighting device 100 according to the first embodiment will be described.

Figure 1:
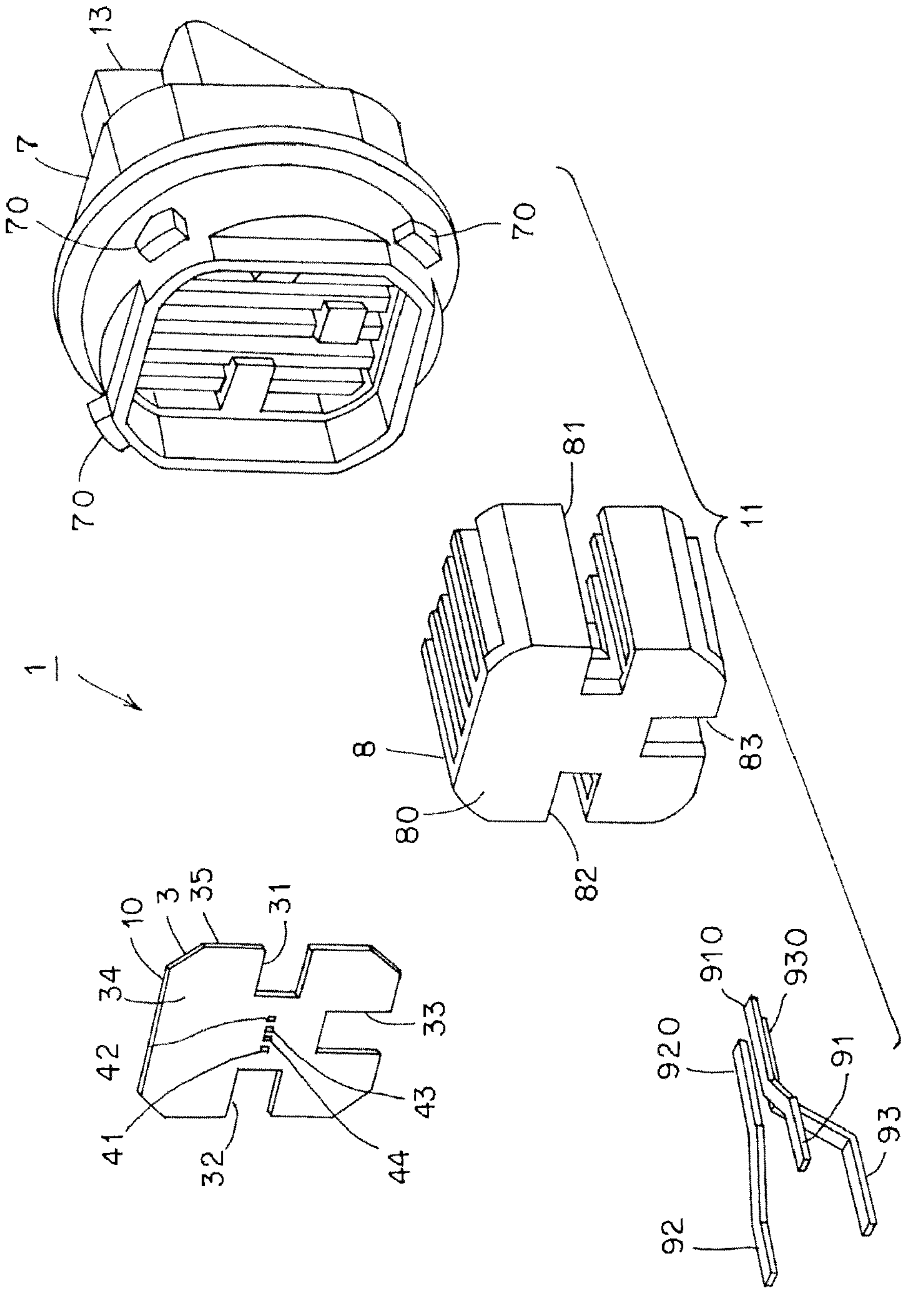
FIG. 1 is an exploded perspective view of a light source, an insulating member in a socket, a radiating member and a feed member of a light source unit for a semiconductor-type light source of a vehicle lighting device according to a first embodiment of the present invention.
Figure 2:
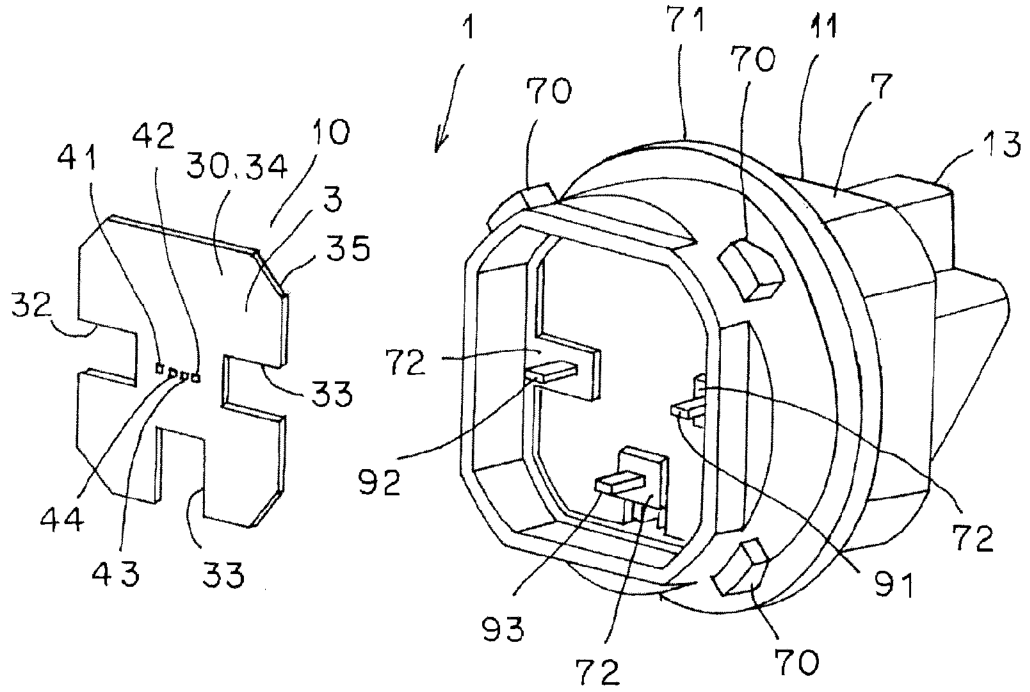
FIG. 2 is an exploded perspective view of the light source and the socket.
Figure 3:
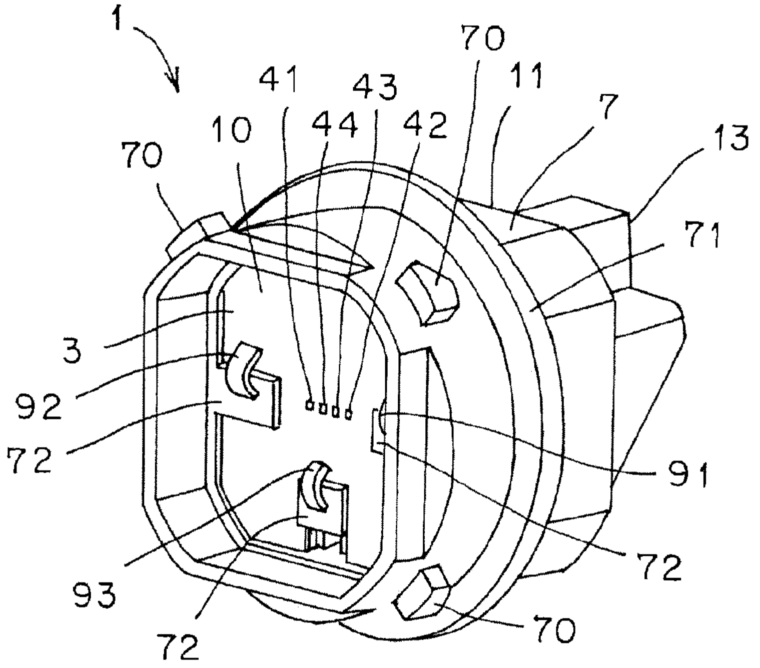
FIG. 3 is a perspective view of the light source and the socket which are assembled together.
Figure 4:
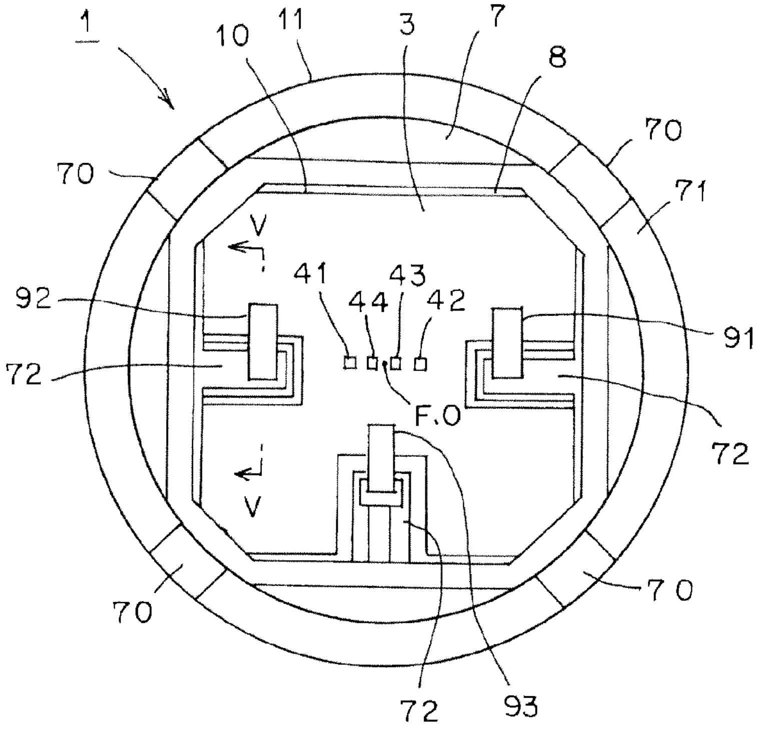
FIG. 4 is a plan view (i.e., a view seen from above) illustrating the light source and the socket which are assembled together.

In the light source unit 1 and the vehicle lighting device 100 according to the first embodiment, the light source 10 is constituted by the light emitting chips 41 to 44, the resistors 51, 52, the diodes 53, 54 and the wiring 6 which are attached to the base plate 3 as illustrated in FIGS. 1 to 3, while the socket 11 is constituted by the radiating member 8 and the feed members 91 to 93 integrally assembled to the insulating member 7 in a mutually insulated manner. The light source 10 is attached to the socket 11 with the base plate 3 and the radiating member 8 in abutment with each other. In particular, in the light source unit 1 and the vehicle lighting device 100 according to the first embodiment, the light source 10 constituted by the light emitting chips 41 to 44, the resistors 51, 52, the diodes 53, 54, the wiring 6 and the base plate 3 and the socket 11 constituted by the radiating member 8, the feed members 91 to 93 and the insulating member 7 are integrally assembled together. Thus, the light source unit 1 and the vehicle lighting device 100 according to the first embodiment can be reduced in size as compared with a related art light source unit in which an LED, a resistor, a diode and a conductor are mechanically and electrically connected together with upper and lower contact portions and then assembled to a socket casing.

Figure 8:
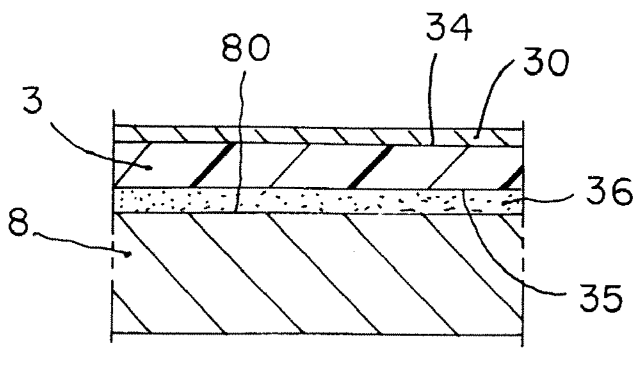
FIG. 8 is a partially enlarged longitudinal sectional view (i.e., a vertical sectional view) of a base plate and a radiating member which are in contact with each other.

In the light source unit 1 and the vehicle lighting device 100 according to the first embodiment, the contact surface 35 of the base plate 3 and the contact surface 80 of the radiating member 8 are in abutment with each other as illustrated in FIGS. 7 to 9. Thus, heat generated in the radiating member 8, the light emitting chips 41 to 44, the resistors 51, 52, the diodes 53, 54 and the wiring 6 is transferred to the radiating member 8 via the base plate 3 and is made to radiate outward (by emission, diffusion, heat radiation, heat divergence and heat diffusion) from the radiating member 8 (especially from the fin-shaped portion at the other end). With this structure, the problem regarding heat radiation in the light emitting chips 41 to 44, the resistors 51, 52, the diodes 53, 54 and the wiring 6 can be solved by the light source unit 1 and the vehicle lighting device 100 according to the first embodiment.

Figure 15:
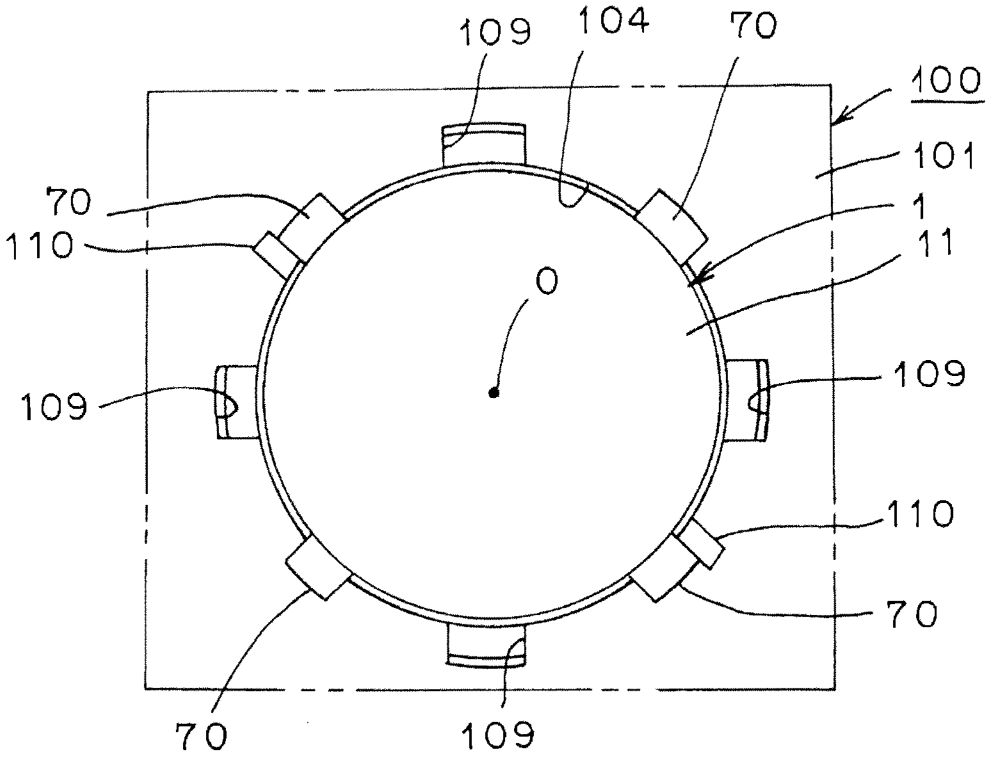
FIG. 15 is a plan view of the light source unit attached to the lamp housing.
Figure 16:
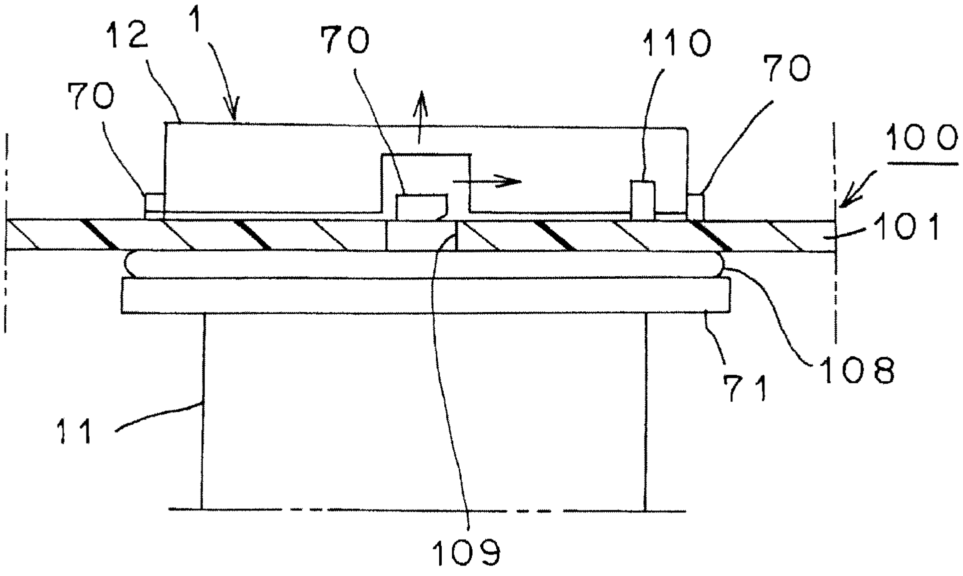
FIG. 16 is a front view of the light source unit inserted in the mounting hole of the lamp housing.
Figure 17:
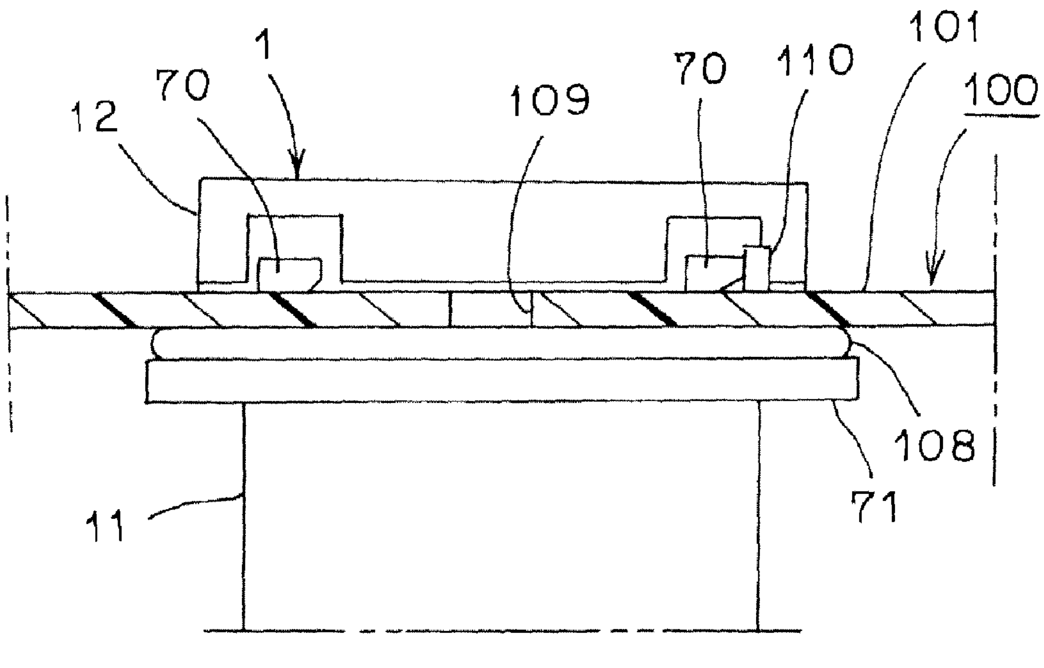
FIG. 17 is a front view of the light source unit attached to the lamp housing.
Figure 22:
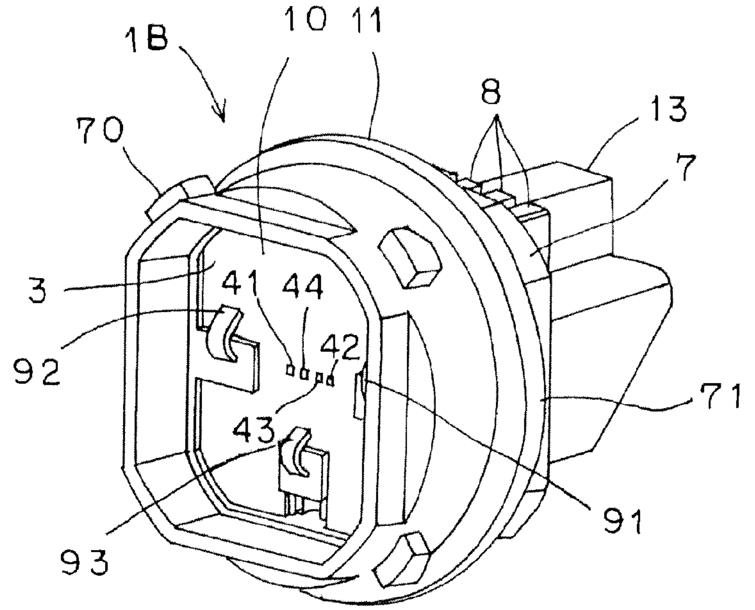
FIG. 22 is a perspective view of a light source unit for a semiconductor-type light source of a vehicle lighting device according to a second embodiment of the present invention.
Figure 23:
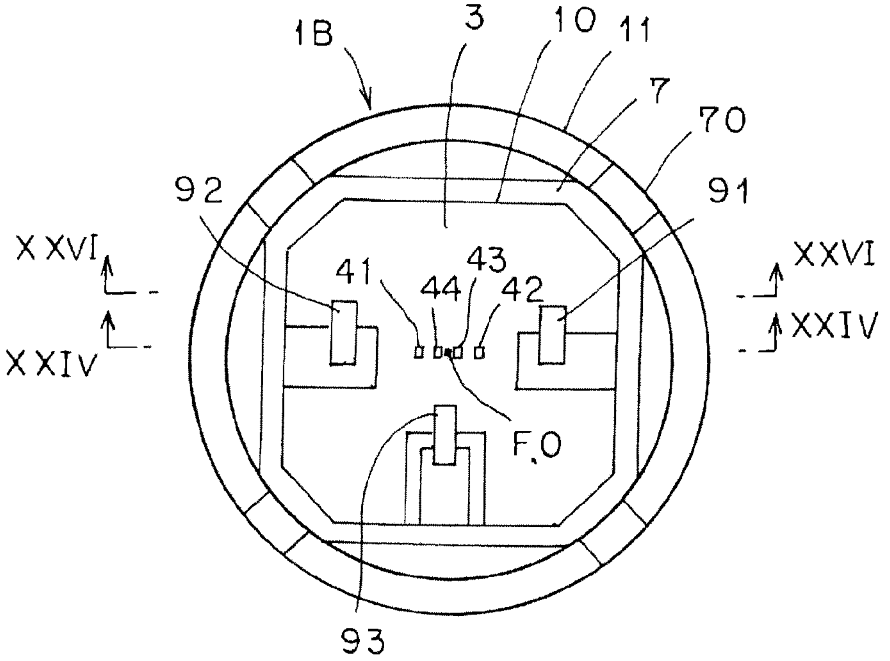
FIG. 23 is a plan view of the light source unit illustrated in FIG. 22.

In the light source unit 1 and the vehicle lighting device 100 according to the first embodiment, the light source unit 1 can be attached to the vehicle lighting device 100 in a removable manner by the mounting units 70 of the insulating member 7 of the socket 11 as illustrated in FIGS. 15 and 22. Thus, the light source unit 1 can be removed from the vehicle lighting device 100 and replaced.

In the light source unit 1 and the vehicle lighting device 100 according to the first embodiment, the connector unit 13 is constituted by a part of the insulating member 7 and a part of the feed members 91 to 93 (i.e., the male terminals 910 to 930) as illustrated in FIG. 7. Thus, the effect of reduction in size and the heat radiation effect are not impaired even if the connector unit 13 is provided in the socket 10.

In the light source unit 1 and the vehicle lighting device 100 according to the first embodiment, the light source 10 is covered with the cover 12 as illustrated in FIGS. 11 and 12 to protect the light emitting chips 41 to 44, the resistors 51, 52, the diodes 53, 54, the wiring 6 and the base plate 3 of the light source 10 by the cover 12. In the light source unit 1 and the vehicle lighting device 100 according to the first embodiment, since the light emitted from the light emitting chips 41 to 44 can be controlled optically by the optical control unit 120 of the cover 12, the optical control design of the vehicle lighting device 100 is simplified. If the air vent 121 is provided in the cover 12 as illustrated by the dotted line in FIG. 12 in the light source unit 1 and the vehicle lighting device 100 according to the first embodiment, heat generated in the light emitting chips 41 to 44, the resistors 51, 52, the diodes 53, 54 and the wiring 6 which are covered with the cover 12 can be made to escape outward through the air vent 121. Thus, the heat radiation effect is further enhanced.

In the light source unit 1 and the vehicle lighting device 100 according to the first embodiment, the light emitted from the light emitting chips 41 to 44 can be reflected with high reflectivity on the highly reflective surface 30 of the base plate 3 as illustrated in FIG. 8. The light emitted from the light emitting chips 41 to 44 can be used effectively.

In the light source unit 1 and the vehicle lighting device 100 according to the first embodiment, the base plate 3 and the radiating member 8 are made to adhere to each other by the thermally conductive adhesive 36 and therefore the radiating member 8 and the insulating member 7 are in close contact with each other as illustrated in FIG. 8. Thus, in the light source unit 1 and the vehicle lighting device 100 according to the first embodiment, heat generated in the light emitting chips 41 to 44, the resistors 51, 52, the diodes 53, 54 and the wiring 6 of the light source 10 is transferred to the radiating member 8 via the base plate 3 and is made to radiate outward from the radiating member 8 and then transferred from the radiating member 8 to the insulating member 7 where the heat is made to radiate outward. Thus, the heat radiation effect is enhanced.

In the light source unit 1 and the vehicle lighting device 100 according to the first embodiment, one ends (i.e., the upper ends) of the feed members 91 to 93 are made to protrude from the projection 72 of the insulating member 7 and are bent to be electrically connected to the wiring 6 of the base plate 3 as illustrated in FIG. 5. Thus, the effect of reduction in size and the heat radiation effect are not impaired. In the light source unit 1 and the vehicle lighting device 100 according to the first embodiment, one ends (i.e., the upper ends) of the feed members 91 to 93 protrude from the projection 72 of the insulating member 7 and are not in contact with the base plate 3. Thus, no bending stress is applied from the one ends (i.e., the upper ends) of the feed members 91 to 93 to the base plate 3 during the bending of the one ends (i.e., the upper ends) of the feed members 91 to 93. Thus, no damage, such as cracks, occurs in the base plate 3.

In the light source unit 1 and the vehicle lighting device 100 according to the first embodiment, a portion of the socket 11 protruding from the lamp housing 101 (i.e., a portion below the lamp housing 101 illustrated by a two-dot chain line in FIG. 11) is larger in diameter than a portion of the socket 11 housed in the lamp compartment 105 (i.e., a portion above the lamp housing 101 illustrated by the two-dot chain line in FIG. 11) as illustrated in FIG. 11. Thus, heat generated in the light source is emitted outward via the socket which protrudes in the most part thereof. Thus, the heat radiation effect is further enhanced.

In the light source unit 1 and the vehicle lighting device 100 according to the first embodiment, waterproofness is enhanced by the waterproof packing 108 disposed between the lamp housing 101, at a portion outside the lamp compartment 105, and the insulating member 7 of the socket 11 as illustrated in FIGS. 11 and 18. The most of the heat generated in the light source 10 is emitted outward from the radiating member 8 of the socket 11 and thus the amount of heat transferred to the insulating member 7 of the socket 11 is small. Thus, the waterproof packing 108 disposed between the lamp housing 101, at a portion outside the lamp compartment 105, and the insulating member 7 of the socket 11 can be protected from the heat of the light source 10.

Figure 14:
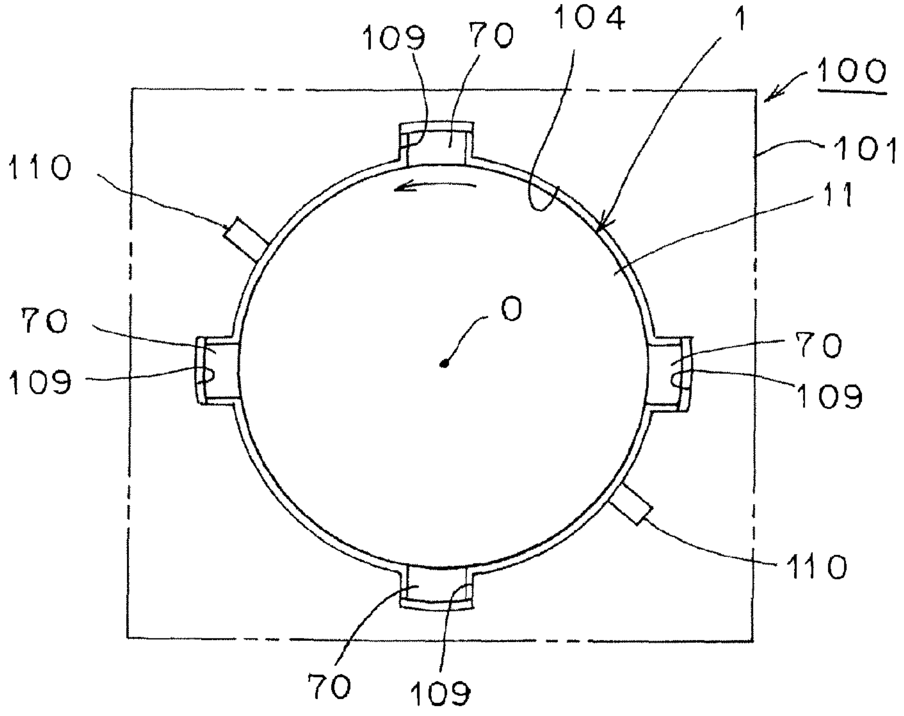
FIG. 14 is a plan view of the light source unit inserted in the mounting hole of the lamp housing.

In the light source unit 1 and the vehicle lighting device 100 according to the first embodiment, the socket 11 is rotated about the center O to be removably attached to the lamp housing 101 by the mounting units 70 and the light emitting chips 41 to 44 are disposed near the center O of the socket 11 as illustrated in FIGS. 4 and 14. Thus, in the light source unit 1 and the vehicle lighting device 100 according to the first embodiment, when the socket 11 is rotated about the center O of the socket 11 to be attached to the lamp housing 101 by the mounting units 70 and thereby the light source 10 is disposed inside the lamp compartment 105, the light emitting chips 41 to 44 are located near the center O of the socket 11 via the base plate 3 and the radiating member 8. Thus, positional variation of the lamp compartment 105 of the light emitting chips 41 to 44 can be reduced as much as possible. Thus, in the light source unit 1 and the vehicle lighting device 100 in the first embodiment, variation in light distribution can be reduced as much as possible. With this, light distribution control becomes easy and the light distribution design is simplified, whereby eventually contributing to traffic safety.

The light emitting chips 41 to 44, the resistors 51, 52 and the diodes 53, 54 as the control devices, the wiring 6 as the wiring device are attached to the mounting surface 34 of the base plate 3 as illustrated in FIGS. 1 to 4. Thus, the light source unit 1 and the vehicle lighting device 100 according to the first embodiment can be implemented with the reduced number of parts, with the parts reduced in size and in reduced manufacturing cost.

In the light source unit 1 and the vehicle lighting device 100 according to the first embodiment, heat generated in the light emitting chips 41 to 44, the resistor 52 and the diodes 54 as the control devices, the wiring 6 as the wiring device can be emitted outward efficiently. Thus, the light emission efficiency of the light emitting chips 41 to 44 is further enhanced.

In the light source unit 1 and the vehicle lighting device 100 according to the first embodiment, a group of the light emitting chips which always emit light, i.e., the light emitting chips 43, 44 constituting the tail lamp function (also constituting the stop lamp function) is disposed between other groups of light emitting chips, i.e., the light emitting chips 43, 44 constituting the stop lamp function (i.e., the light emitting chips which emit light for the stop lamp function and do not emit light for the tail lamp function). Thus, the group of the light emitting chips i.e., the light emitting chips 43, 44 constituting the tail lamp function, can be disposed close to each other. Thus, in the light source unit 1 and the vehicle lighting device 100 according to the first embodiment, when the group of the light emitting chips which always emit light, i.e., the light emitting chips 43, 44 constituting the tail lamp function (also constituting the stop lamp function) is made to emit light, there is no missing of light between the group of the light emitting chips which always emit light, i.e., the light emitting chips 43, 44 constituting the tail lamp function (also having the stop lamp function). Thus, the optical design is simplified.

In the light source unit 1 and the vehicle lighting device 100 according to the first embodiment, the light emitting chips 41 to 44, especially the light emitting chips 43, 44 constituting the tail lamp function, are disposed near the focus F of the reflector 103 as the light distribution control unit. Thus, the optical design is simplified.

The light source unit 1 and the vehicle lighting device 100 according to the first embodiment have the four light emitting chips 41 to 44 arranged in a concentrated manner and are therefore suited for a vehicle lighting device with a single lighting system.

Second Embodiment

FIGS. 22 to 26 illustrate a light source unit for a semiconductor-type light source of a vehicle lighting device according to a second embodiment of the present invention. The same reference numerals are provided to denote the same components through FIGS. 1 to 26.

Figure 24:
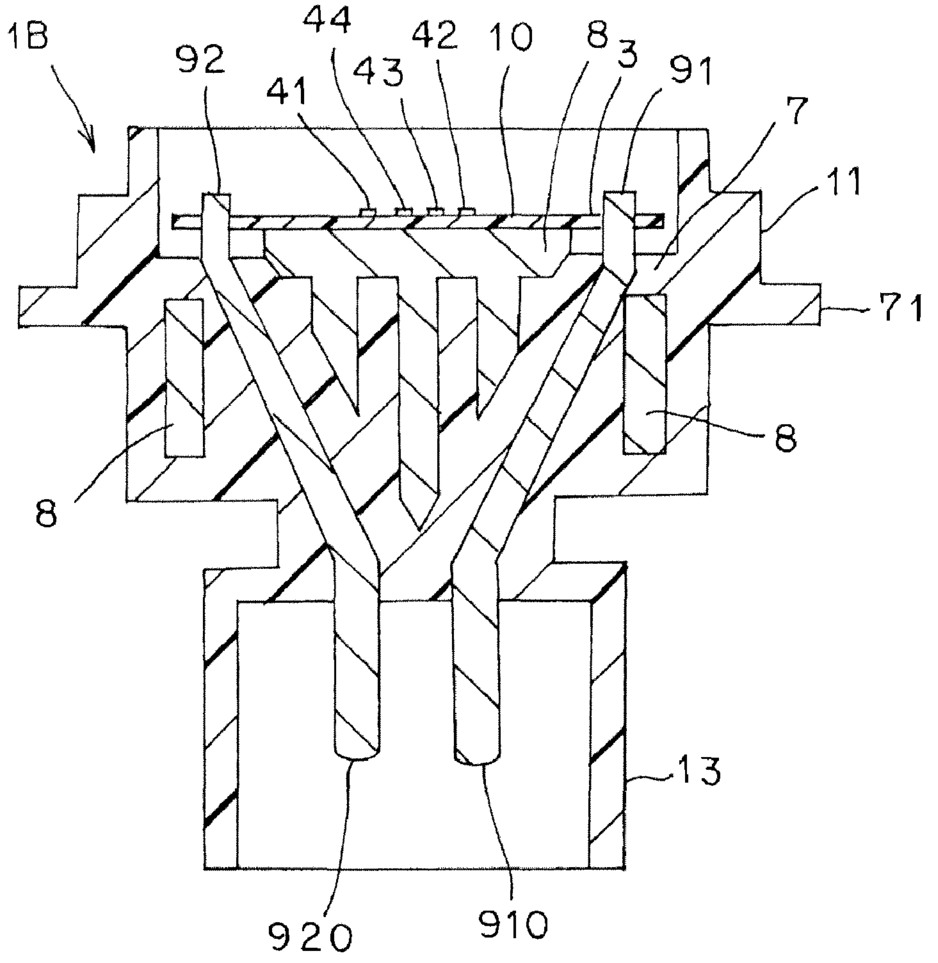
FIG. 24 is a sectional view through section XXIV-XXIV of FIG. 23.
Figure 25:
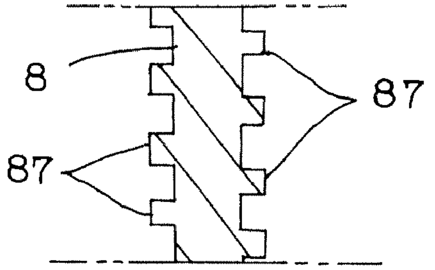
FIG. 25 is a partially enlarged longitudinal sectional view of a radiating member.
Figure 26:
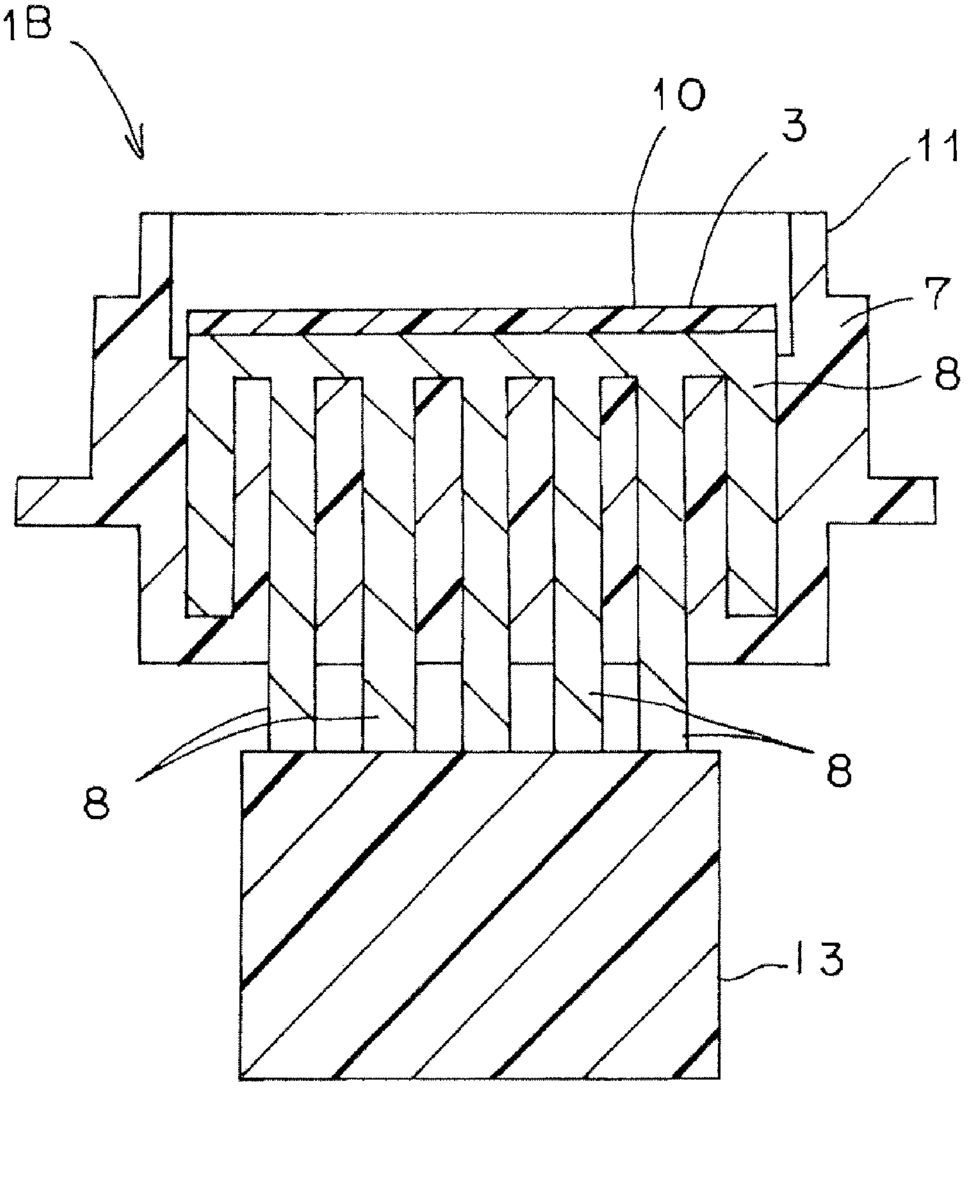
FIG. 26 is a sectional view through section XXVI-XXVI of FIG. 23.

As illustrated in FIGS. 22 and 26, in a light source unit 1B for a semiconductor-type light source of a vehicle lighting device according to the second embodiment, a portion of the radiating member 8, especially a fin-shaped portion at the rear of the radiating member 8, is exposed from an insulating member 7. As is illustrated in FIGS. 24 and 26, in the light source unit 1B for the semiconductor-type light source of the vehicle lighting device according to the second embodiment, the radiating member 8 is partially covered with the insulating member 7. As illustrated in FIG. 25, the light source unit 1B for the semiconductor-type light source of the vehicle lighting device according to the second embodiment includes a cleated portion 87 at least partially on a surface of the radiating member 8 which is in contact with the insulating member 7.

As illustrated in FIG. 25, the cleated portion 87 is formed as, for example, very small (e.g., in the order of nanometer) uneven configuration. The cleated portion 87 is formed by, for example, physical process, such as blasting, and chemical process, such as a chemical process.

In the light source unit 1B for the semiconductor-type light source of the vehicle lighting device according to the second embodiment, a portion of the radiating member 8, especially a fin-shaped portion at the rear of the radiating member 8, is exposed from an insulating member 7. Thus, heat transferred from the light emitting unit 10 to the radiating member 8 can be efficiently emitted outward and the heat radiation effect can therefore be enhanced further.

In the light source unit 1B for the semiconductor-type light source of the vehicle lighting device according to the second embodiment, the radiating member 8 is partially covered with the insulating member 7. Thus, adhesiveness between the part of the radiating member 8 and the insulating member 7 is enhanced, waterproofness and reliability between the radiating member 8 and the insulating member 7 is enhanced, and peeling of the radiating member 8 from the insulating member 7 becomes less easily occur.

In the light source unit 1B for the semiconductor-type light source of the vehicle lighting device according to the second embodiment, the cleated portion 87 is provided at least a part of the surface of radiating member 8 which is in contact with the insulating member 7. Thus, adhesiveness between the part of the radiating member 8 and the insulating member 7 is enhanced, waterproofness and reliability between the radiating member 8 and the insulating member 7 is enhanced, and peeling of the radiating member 8 from the insulating member 7 becomes less easily occur.

Third Embodiment

Figure 27:
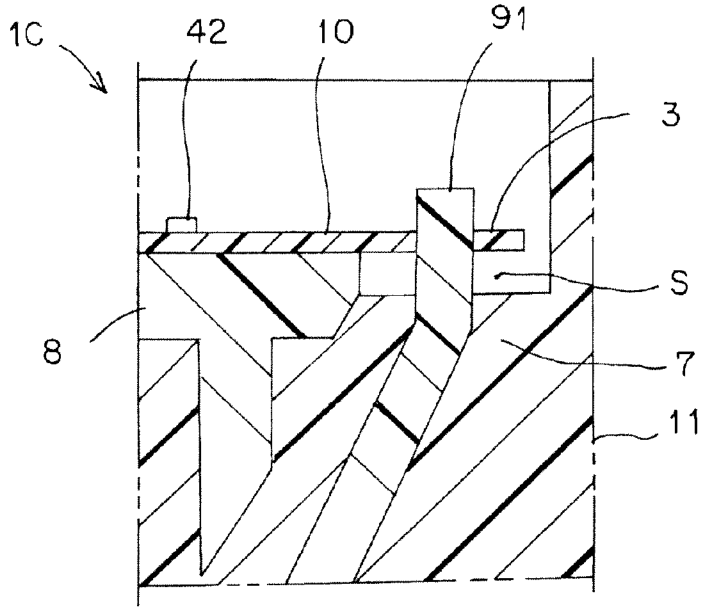
FIG. 27 is a partially cross-sectional view of a light source unit for a semiconductor-type light source of a vehicle lighting device according to a third embodiment the present invention.

FIG. 27 illustrates a light source unit for a semiconductor-type light source of a vehicle lighting device according to a third embodiment of the present invention. The same reference numerals are provided to denote the same components through FIGS. 1 to 26.

In a light source unit 1C for a semiconductor-type light source of a vehicle lighting device according to the third embodiment, a base plate 3 is in contact with a radiating member 8 and is not in contact with the insulating member 7 via a space S as illustrated in FIG. 27. Thus, in the light source unit 1C for the semiconductor-type light source of the vehicle lighting device in the third embodiment, heat generated in the light emitting chips 41 to 44 and the resistors 51, 52 and the diodes 53, 54 as the control devices, and the wiring 6 as the wiring device is efficiently transferred to the radiating member 8 (which has thermal conductivity greater than that of the insulating member 7) via the base plate 3, and is efficiently emitted outward from the radiating member 8. Thus, the heat radiation effect can be enhanced further.

Fourth Embodiment

Figure 28A:
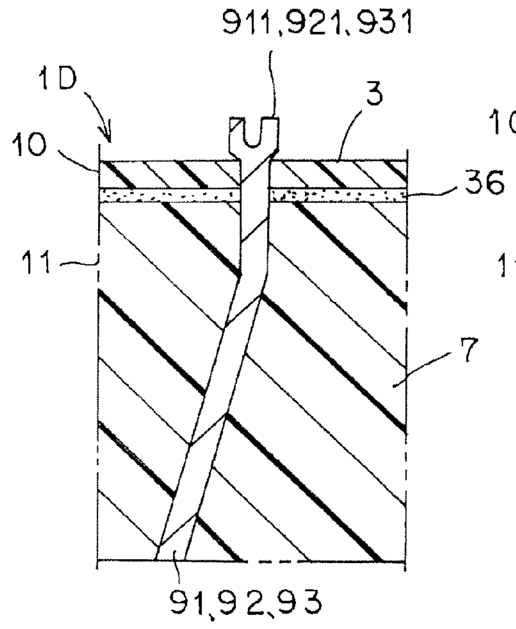
FIG. 28A and FIG. 28B are sectional views of a light source unit for a semiconductor-type light source of a vehicle lighting device according to a fourth embodiment of the present invention, illustrating a base plate being attached to a radiating member with a fixing portion of a feed member.
Figure 28B:
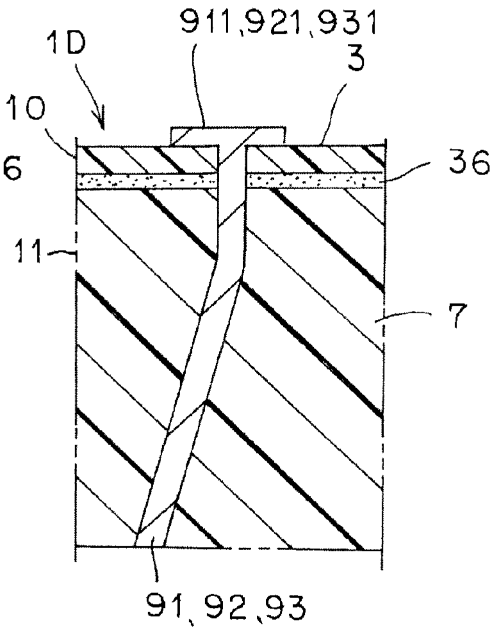

FIGS. 28A and 28B illustrate a light source unit for a semiconductor-type light source of a vehicle lighting device according to a fourth embodiment of the present invention. The same reference numerals are provided to denote the same components through FIGS. 1 to 27.

As illustrated in FIGS. 28A and 28B, in a light source unit 1D for a semiconductor-type light source of a vehicle lighting device according to the fourth embodiment, a base plate 3 is mechanically attached to the radiating member 8 by fixing portions 911, 921 and 931 which are portions of feed members 91 to 93. In particular, each of the fixing portions 911 to 931 of the feed members 91 to 93 is formed as a split pin as illustrated in FIG. 28A. The fixing portions 911 to 913 formed as split pins are expanded horizontally as illustrated in FIG. 28B. The expanded split pin-shaped fixing portions 911 to 913 are fixed to the base plate 3 by soldering, laser welding or resistance welding. Thus, the base plate 3 is mechanically attached to the radiating member 8 by the fixing portions 911 to 931 which are portions of the feed members 91 to 93.

In the light source unit 1D for the semiconductor-type light source of the vehicle lighting device according to the fourth embodiment, the base plate 3 is mechanically attached to the radiating member 8 with a thermally conductive adhesive 36 at the fixing portions 911 to 931 which are portions of the feed members 91 to 93. Thus, the base plate 3 can be securely fixed to the radiating member 8, thereby providing sufficient resistance to vehicle vibration.

Fifth Embodiment

Figure 29:
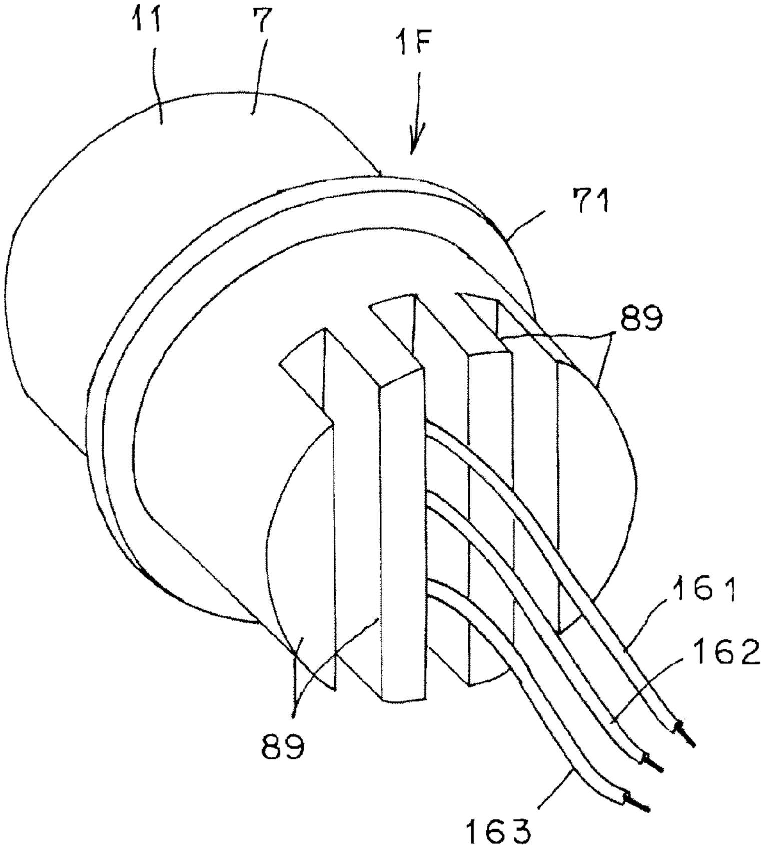
FIG. 29 is a perspective view of a light source unit for a semiconductor-type light source of a vehicle lighting device according to a fifth embodiment of the present invention.
Figure 30:
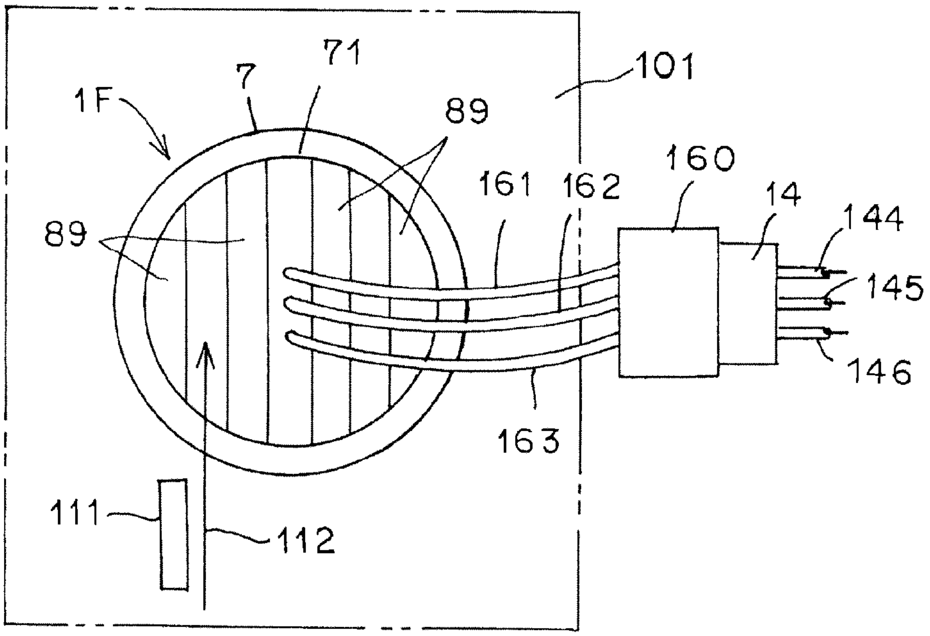
FIG. 30 is a bottom view of the light source unit illustrated in FIG. 29.

FIGS. 29 and 30 illustrate a light source unit for a semiconductor-type light source of a vehicle lighting device according to a fifth embodiment of the present invention. The same reference numerals are provided to denote the same components through FIGS. 1 to 28.

In a light source unit 1F for a semiconductor-type light source of a vehicle lighting device according to the fifth embodiment 5, as illustrated in FIGS. 29 and 30, a radiating member 89 is partially formed as fin-shaped portions. A lamp housing 101 and an insulating member 7 includes a stopper (see the mounting units 70 and the stopper 110 of the first embodiment and see FIGS. 15 and 17). The stopper causes the socket 11 to be stopped at a predetermined position when the socket 11 is attached to the lamp housing 101 with the mounting units (see the mounting units 70 of the first embodiment) such that a longitudinal direction (see the arrow in FIG. 30) of the fin-shaped portion 89 of the radiating member corresponds to an air flow direction 112 (a substantially vertical direction in the fifth embodiment).

As illustrated in FIGS. 29 and 30, in the light source unit 1F for the semiconductor-type light source of the vehicle lighting device according to the fifth embodiment, the socket 11 is not integrated with the connector unit 13. In particular, a light source side connector 160 is provided separately from the socket 11. The light source side connector 160 is electrically connected to the feed member (see the feed members 91 to 93 of the first embodiment) of the light source unit 1F via harnesses 161, 162 and 163. A power supply side connector 14 is attached to the light source side connector 160 so as to supply electric power to the light source 10. When the power supply side connector 14 is removed from the light source side connector 160, the electric supply to light source 10 is suspended.

In the thus-structured light source unit 1F for the semiconductor-type light source of the vehicle lighting device according to the fifth embodiment, when the socket 11 is attached to the lamp housing 101 with the mounting units, the longitudinal direction of the fin-shaped portion 89 of the radiating member corresponds to an air flow direction 112 (a substantially vertical direction in the fifth embodiment). Thus, heat is radiated along the air flow direction along the longitudinal direction of the fin-shaped portion 89 of the radiating member (i.e., in the substantially vertical direction upward in the fifth embodiment), thereby further improving the heat radiation effect. Note that the vehicle lighting device usually includes a rib 111 (see FIG. 30) and a clearance (not illustrated) at least one of the lamp housing 101 or the vehicle body (not illustrated) for the mounting of the lamp housing 101 on the vehicle body. In that case, air is caused to flow along the rib 111 or the clearance. Thus, the light source unit 1F for the semiconductor-type light source of the vehicle lighting device according to the fifth embodiment is suited for the improvement in the heat radiation effect in the case described above. The rib 111 and the clearance are formed along a substantially vertical direction. Note that different vehicle models have different mounting relationships between the lamp housing 101 and the vehicle body. Thus, it is not necessary to provide the rib 111 or the clearance along the vertical direction; the rib 111 or the clearance may be, instead, tilted, bent or curved. In this case, the longitudinal direction of the fin-shaped portion 89 of the radiating member is made to correspond to the tilted, air flow direction.

Sixth Embodiment

Figure 31:
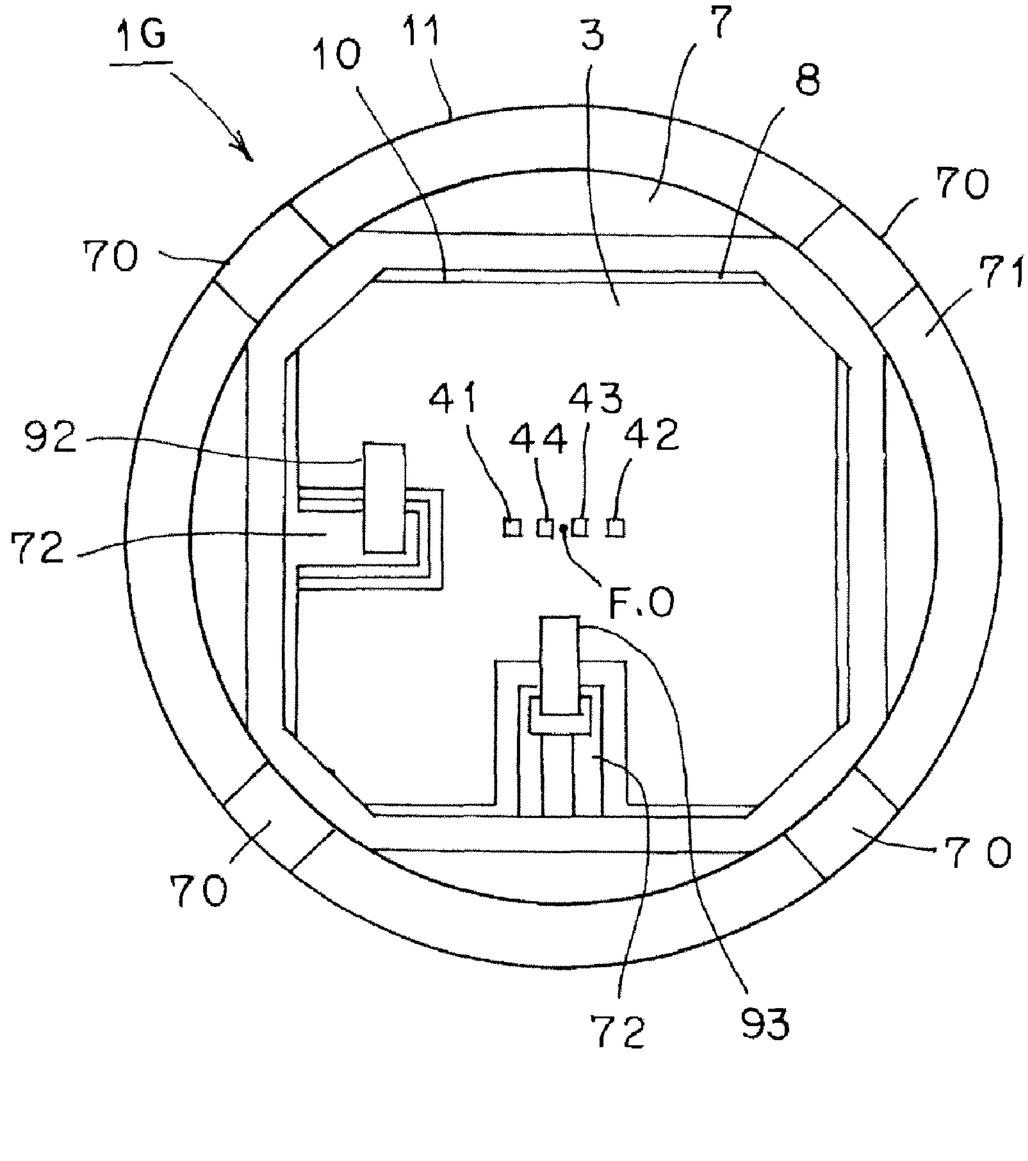
FIG. 31 is a plan view of a base plate of a light source of a light source unit for a semiconductor-type light source of a vehicle lighting device according to a sixth embodiment of the present invention.
Figure 32:
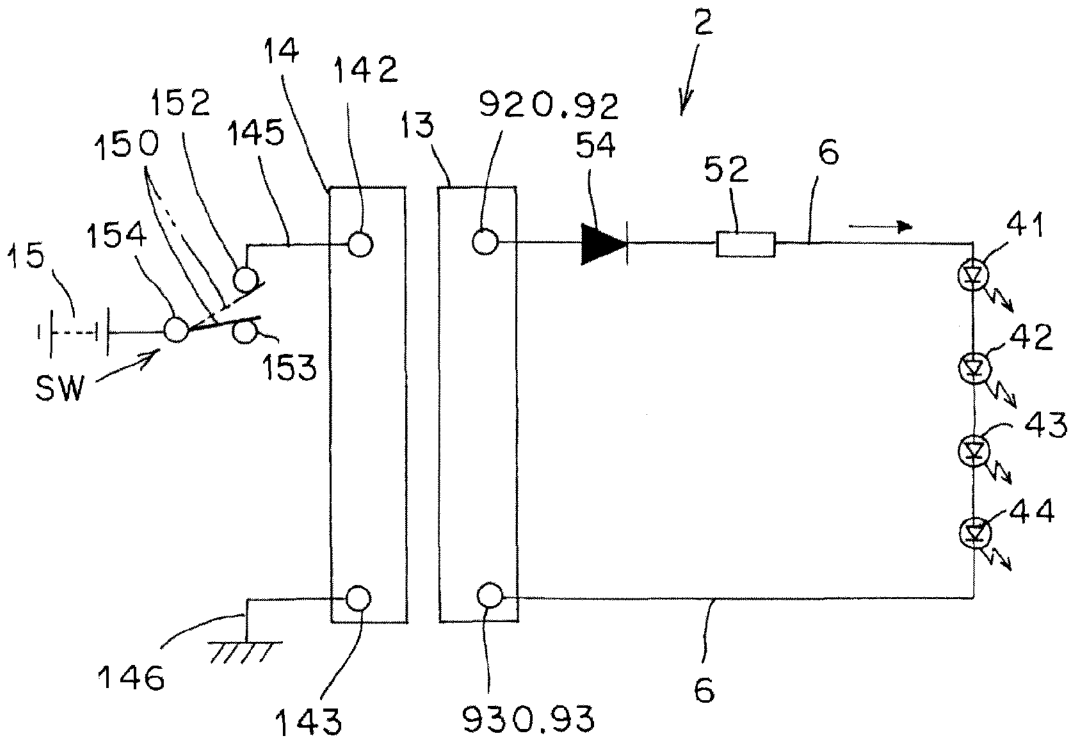
FIG. 32 is an electric diagram of a drive circuit for the semiconductor-type light source of the light source unit.

FIGS. 31 and 32 illustrates a light source unit for a semiconductor-type light source of a vehicle lighting device according to a sixth embodiment of the present invention. The same reference numerals are provided to denote the same components through FIGS. 1 to 30.

The light source units 1, 1B, 1C, 1D and 1F according to the first to fifth embodiments and the vehicle lighting device 100 are tail/stop lamps with a single lighting system. In particular, the light source units 1, 1B, 1C, 1D and 1F according to the first to fifth embodiments and the vehicle lighting device 100 constitute the tail lamp function as a first lamp function and the stop lamp function as a second lamp function with a single lighting system (with a single lamp and a single lighting device). Thus, the light source units 1, 1B, 1C, 1D and 1F according to the first to fifth embodiments and the vehicle lighting device 100 constitute a double functional (i.e., multifunctional) lamp. On the contrary, the light source unit 1G according to the sixth embodiment constitutes a single functional (one function) lamp. For example, the light source unit 1G according to the sixth embodiment and the vehicle lighting device 100 constitute a direction indicator lamp, a reversing lamp, a stop lamp, a tail lamp, a low beam head lamp (i.e., a head lamp suited to be used when passing another vehicle coming in an opposite direction), a high beam head lamp (i.e., a head lamp suited for normal travelling), a fog lamp, a clearance lamp, a cornering lamp and a daytime running light.

As illustrated in a plan view of the base plate of FIG. 31 and an electric diagram of FIG. 32, the wiring 6, the resistor 51, the diode 53 and the first feed member 91 constituting the first lamp function which have been illustrated in the plan view of the base plate in FIG. 4 and the electric diagram of FIG. 21 are not provided.

In the plan view of the base plate of FIG. 31 and the electric diagram of FIG. 32, the first feed member 91 illustrated in the plan view of the base plate of FIG. 4 and the electric diagram of FIG. 21 may be used as a ground instead of the third feed member 93 which is currently used as the ground.

Two light emitting chips 41, 42, the wiring 6, the resistor 52, the diode 54 and the second feed member 92 constituting the second lamp function illustrated in the plan view of the base plate of FIG. 4 and the electric diagram of FIG. 21 may be omitted. In this case, the second feed member 92 may be used as a ground instead of the third feed member 93 currently used as the ground.

Alternatively, the wiring 6, the resistor 51, the diode 53 which altogether constitute the first lamp function or the two light emitting chips 41, 42, the wiring 6, the resistor 52 and the diode 54 altogether constitute the second lamp function may be omitted whereas the first feed member 91 constituting the first lamp function or the second feed member 92 constituting the second lamp function may be provided. Alternatively, only the first feed member 91 constituting the first lamp function or only the second feed member 92 constituting the second lamp function may be omitted whereas the wiring 6, the resistor 51, the diode 53 which altogether constitute the first lamp function or the two light emitting chips 41, 42, the wiring 6, the resistor 52 and the diode 54 altogether constitute the second lamp function may be provided.

Other Embodiments

Four light emitting chips 41 to 44 are employed in the first to sixth embodiments. In the present invention, however, one, two, three, five or more light emitting chips may be employed. The number and the arrangement of the light emitting chips which constitute the tail lamp function and the number and the arrangement of the light emitting chips which constitute the stop lamp function are not particularly limited. In addition, the number and the arrangement of the light emitting chips which constitute the single function lamp are not particularly limited.

The first to sixth embodiments are used as a tail/stop lamp. The present invention, however, may also be used for a combination lamp or a single function lamp in addition to the tail/stop lamp. Examples of the single function lamp include a direction indicator lamp, a reversing lamp, a stop lamp, a tail lamp, a low beam head lamp (i.e., a head lamp suited to be used when passing another vehicle coming in an opposite direction), a high beam head lamp (i.e., a head lamp suited for normal travelling), a fog lamp, a clearance lamp, a cornering lamp and a daytime running light.

The first to sixth embodiments are used for the switch of the two lamps; the tail lamp and the stop lamp. In the present invention, however, three or more lamps may be employed.

In the first to sixth embodiments, the four light emitting chips 41 to 44 are arranged in series. In the present invention, however, the light emitting chips may be arranged in a plurality of lines, at square corners or in a circle configuration. For example, the light emitting chips may be arranged at each of square corners or at each of triangular corners.

In the first to sixth embodiments, the light distribution control is implemented by the cover 12 and the lamp lens 102. In the present invention, however, the light distribution control may be implemented by at least one of the cover 12 and the lamp lens 102.

In the first to sixth embodiments, all of the four light emitting chips 41 to 44 constitute the stop lamp function and the two light emitting chips 43, 44 among them constitute the tail lamp function. In the present invention, however, all the four light emitting chips 41 to 44 may constitute the stop lamp function and the two light emitting chips 41, 42 among them may constitute the tail lamp function.

In the first to sixth embodiments, the feed members 91 to 93 are divergent from one ends toward the other ends and are arranged substantially in line along a center line direction (i.e., an optical axis direction of the light source unit 1) of the light source unit 1. However, the configuration of the feed members is not particularly limited in the present invention.

In the first to sixth embodiments, the connector 14 is a 3-pin or 2-pin standardized connector that can be attached the connector unit 13 to be mechanically removable and electrically connected and disconnected. In the present invention, however, the connector may be a non-standardized connector that is prepared in accordance with the structure of the connector unit 13.

What is claimed is:

1. A light source unit for a semiconductor-type light source of a vehicle lighting device, comprising:

a light source and a socket to which the light source is attached, wherein:

the light source includes a base plate, a light emitting chip for the semiconductor-type light source, a control device which controls light emission of the light emitting chip and a wiring device which supplies electric power to the light emitting chip via the control device, the light emitting chip, the control device, and the wiring device being attached to the base plate;

the socket includes an insulating member, a radiating member which makes heat generated in the light source radiate outward and a feed member which supplies electric power to the light source, the radiating member and the feed member being assembled to the insulating member in a mutually insulated manner;

the base plate and the radiating member are in abutment with each other; and the insulating member includes a mounting unit for an attachment to the vehicle lighting device in a removable manner.

2. The light source unit for the semiconductor-type light source of the vehicle lighting device according to claim 1, wherein:

the socket includes a connector unit to which a power supply side connector is attached to be mechanically removable and electrically connected and disconnected; and the connector unit is constituted by a part of the insulating member and a part of the feed member.

3. The light source unit for the semiconductor-type light source of the vehicle lighting device according to claim 1, wherein:

the light source includes a cover which covers the socket; and the cover includes an optical control unit which optically controls light emitted from the light emitting chip.

4. The light source unit for the semiconductor-type light source of the vehicle lighting device according to claim 1, wherein a highly reflective surface is provided on a surface of the base plate on which the light emitting chip is provided.

5. The light source unit for the semiconductor-type light source of the vehicle lighting device according to claim 1, wherein the base plate and the radiating member are made to adhere to each other by a thermally conductive adhesive and therefore the radiating member and the insulating member are in close contact with each other.

6. The light source unit for the semiconductor-type light source of the vehicle lighting device according to claim 1, wherein:

the base plate includes a notch at a position at which the feed member is disposed;

the insulating member includes a projection at a position corresponding to the notch to be disposed in the notch; and the feed member protrudes from the projection and is bent to be electrically connected to the wiring device of the base plate.

7. The light source unit for the semiconductor-type light source of the vehicle lighting device according to claim 1, wherein the radiating member is partially exposed from the insulating member.

8. The light source unit for the semiconductor-type light source of the vehicle lighting device according to claim 1, wherein the base plate is in contact with the radiating member and not in contact with the insulating member.

9. The light source unit for the semiconductor-type light source of the vehicle lighting device according to claim 1, wherein a part of the radiating member is covered with the insulating member.

10. The light source unit for the semiconductor-type light source of the vehicle lighting device according to claim 1, wherein a cleated portion is provided at least partially on a surface of the radiating member which is in contact with the insulating member.

11. The light source unit for the semiconductor-type light source of the vehicle lighting device according to claim 1, wherein the base plate is mechanically attached to the radiating member with a fixing portion which is a portion of the feed member.

12. A vehicle lighting device which includes a semiconductor-type light source as a light source, the vehicle lighting device comprising:

a lamp housing and a lamp lens which altogether define a lamp compartment; and the light source unit for the semiconductor-type light source of the vehicle lighting device according to claim 1 disposed in the lamp compartment.

13. The vehicle lighting device according to claim 12, wherein:

the socket is attached to the lamp housing;

the light source is disposed in the lamp compartment; and a portion of the socket protruding outward from the lamp housing is larger in diameter than a portion of the socket housed in the lamp compartment.

14. The vehicle lighting device according to claim 12, wherein a waterproof packing is provided between the lamp housing, at a portion outside the lamp compartment, and the insulating member of the socket.

15. The vehicle lighting device according to claim 12, wherein:

the socket is removably attached to the lamp housing with the mounting unit rotated about a central axis of the socket; and the light emitting chip is disposed near the central axis of the socket.

16. The vehicle lighting device according to claim 12, wherein:

a part of the radiating member is formed as a fin-shaped portion; and the lamp housing and the insulating member each include a stopper which causes the socket to be stopped at a predetermined position such that the fin-shaped portion of the radiating member is oriented along an air flow direction when the socket is attached to the lamp housing by the mounting unit.

* * * * *